(12) United States Patent
Shima et al.

(10) Patent No.: US 9,736,155 B2
(45) Date of Patent: Aug. 15, 2017

(54) SYSTEM, METHOD, AND APPARATUS FOR AUTHENTICATION

(71) Applicant: FUJITSU LIMITED, Kawasaki-shi, Kanagawa (JP)

(72) Inventors: Taira Shima, Kawasaki (JP); Nobutaka Yamamoto, Kawasaki (JP); Yuma Akune, Bunkyou (JP); Eiji Itou, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 59 days.

(21) Appl. No.: 14/868,462

(22) Filed: Sep. 29, 2015

(65) Prior Publication Data

US 2016/0105438 A1 Apr. 14, 2016

(30) Foreign Application Priority Data

Oct. 9, 2014 (JP) .................. 2014-207665

(51) Int. Cl.
*G06F 7/04* (2006.01)
*H04L 29/06* (2006.01)

(52) U.S. Cl.
CPC ...... *H04L 63/0884* (2013.01); *H04L 63/0853* (2013.01); *H04L 63/104* (2013.01)

(58) Field of Classification Search
CPC H04L 63/0884; H04L 63/0853; H04L 63/104
See application file for complete search history.

(56) References Cited

U.S. PATENT DOCUMENTS

| 2005/0091213 | A1* | 4/2005 | Schutz | ............... G06F 21/32 |
| 2007/0233548 | A1 | 10/2007 | Okawa | |
| 2008/0167888 | A1* | 7/2008 | Keithley | ............... G06Q 20/04 |
| | | | | 713/156 |

(Continued)

FOREIGN PATENT DOCUMENTS

| JP | 63-236879 | 10/1988 |
| JP | 04-102137 | 4/1992 |

(Continued)

*Primary Examiner* — Techane Gergiso
(74) *Attorney, Agent, or Firm* — Fujitsu Patent Center

(57) ABSTRACT

An authentication apparatus updates a first execution information entry corresponding to a first identification information entry of an authentication target having undergone authentication processing, and transmits the first identification and execution information entries to a management apparatus. The management apparatus updates an execution information entry corresponding to the first identification information entry, and stores a first sequence information entry indicating a sequence number. The management apparatus transmits the first sequence and identification information entries to the authentication apparatus. The authentication apparatus then stores the first sequence information entry, and further acquires, from the management apparatus, second execution and sequence information entries corresponding to a second identification information entry identified by comparing the first sequence information entry against a different one received before the reception of the first sequence information entry and stores the acquired information in association with the second identification information entry.

5 Claims, 26 Drawing Sheets

(56) References Cited

U.S. PATENT DOCUMENTS

| | | | | |
|---|---|---|---|---|
| 2008/0320306 A1* | 12/2008 | Yamamura | ............ | H04L 9/3228 |
| | | | | 713/168 |
| 2009/0037729 A1* | 2/2009 | Smith | ................... | H04L 9/3234 |
| | | | | 713/158 |
| 2009/0249014 A1* | 10/2009 | Obereiner | ........... | G06F 12/1441 |
| | | | | 711/164 |
| 2012/0045060 A1* | 2/2012 | Maestrini | ................ | H04L 63/08 |
| | | | | 380/274 |
| 2012/0257759 A1* | 10/2012 | Nick | .................... | H04L 9/0822 |
| | | | | 380/286 |
| 2013/0067217 A1* | 3/2013 | Matzkel | ................. | G06F 21/41 |
| | | | | 713/155 |

FOREIGN PATENT DOCUMENTS

| | | |
|---|---|---|
| JP | 05-204739 | 8/1993 |
| JP | 2007-249872 | 9/2007 |

* cited by examiner

SYSTEM, METHOD, AND APPARATUS FOR AUTHENTICATION

CROSS-REFERENCE TO RELATED APPLICATION

This application is based upon and claims the benefit of priority of the prior Japanese Patent Application No. 2014-207665, filed on Oct. 9, 2014, the entire contents of which are incorporated herein by reference.

FIELD

The embodiments discussed herein are related to a system, a method, and an apparatus for authentication.

BACKGROUND

High-performance mobile terminals, such as mobile phones and smartphones, are in widespread use. The use of such mobile terminals improves convenience in the delivery of tickets for events, such as concerts and plays, and the management of attendees to the events. For example, to each person who has paid admission to an event, a server managing ticket sales transmits a credential representing a ticket for the event as electronic data instead of providing a conventional paper ticket. The credential is encoded into, for example, a two-dimensional code and then transmitted. An example of a two-dimensional code is a Quick Response (QR) Code®. For example, in the case where an attendee has received a two-dimensional code as a credential for an event, the attendee displays the two-dimensional code on the screen of his/her mobile terminal at an entrance gate of the event site and allows an authentication apparatus to read the two-dimensional code on the screen. The authentication apparatus determines whether the attendee is legitimate based on the content of the two-dimensional code. Alternatively, the credential may be stored in an integrated circuit (IC) card embedded in a membership card of the attendee. In this case, the attendee holds the IC card over the authentication apparatus at the entrance gate of the event site to allow the authentication apparatus to read the credential. Then, the authentication apparatus determines whether the attendee is legitimate based on the content of the read credential.

Note that as a system for managing attendees, there has been proposed a reception support system for extracting, for example, upon receiving information on an attendee from a reception apparatus, information identifying the attendee from the received information to create a message and then transmitting the created message to a terminal of a person assigned to serve the attendee.

See, for example, Japanese Laid-open Patent Publication No. 2007-249872.

To determine whether to grant or refuse the admission of each attendee at an entrance gate to an event site, a plurality of authentication apparatuses are prepared in order to manage admission of a large number of attendees to the event site. For example, if there are a plurality of entrance gates, one or more authentication apparatuses are installed at each of the entrance gates.

In the case where there are a plurality of authentication apparatuses, a single credential distributed as electronic data involves the risk of being used multiple times. Sharing authentication execution information, which indicates whether each attendee has undergone an authentication process to enter the event site, across the authentication apparatuses is considered as one way to prevent credentials each distributed as electronic data from being used multiple times. For example, in the case where a credential is illegally copied, more than one attendee is able to enter the event site with the single credential if the authentication apparatuses do not share the authentication execution information. When the authentication execution information is shared, each authentication apparatus is able to refuse authentication of an attendee using a credential already used to authenticate a different attendee by a different authentication apparatus.

In the case where authentication execution information is shared by a plurality of authentication apparatuses, it is possible, for example, to allow authentication execution information of the entire system to be shared by all the authentication apparatuses. In this case, a synchronization process of the authentication execution information (a process for allowing the same content to be shared) is carried out among the authentication apparatuses in order to maintain the consistency of the content of the authentication execution information. As long as the individual authentication apparatuses have the authentication execution information of the same content, each of the authentication apparatuses is able to detect duplicate authentication even if the authentication apparatus is cut off from communication with a server in a center, thus enhancing the convenience of the authentication apparatuses.

In the case of carrying out the synchronization process of the authentication execution information among the authentication apparatuses, exchanging all the authentication execution information in each synchronization process incurs a communication traffic overload, resulting in an increased processing load. In view of this, it is considered to transmit only authentication execution information updated after the previous synchronization process (difference information) to each of the authentication apparatuses. As a way of extracting the difference information from the authentication execution information, extracting authentication execution information updated, for example, after the previous synchronization processing time may be considered. The extraction of the difference information using the time information involves setting the clock on each authentication apparatus in an accurate manner. However, accurate time setting of a number of authentication apparatuses needs sophisticated skills, increasing the processing load of the entire system.

Thus, allowing the plurality of authentication apparatuses to have the authentication execution information of the same content leads to increased processing loads due to synchronization processing of the authentication execution information. Therefore, it is important to perform the synchronization processing more efficiently.

SUMMARY

According to one aspect, there is provided an authentication system including a plurality of authentication apparatuses and a management apparatus. Each of the plurality of authentication apparatuses includes a first memory configured to store identification information entries of individual authentication targets, each in association with an execution information entry indicating whether authentication of the corresponding authentication target has been executed; a first processor configured to receive a credential including an identification information entry of an authentication target, and execute an authentication process of the authentication target; and a first communication interface configured to transmit and receive information to and from the management apparatus. The management apparatus includes a second memory configured to store the identification information entries of the individual authentication targets, each in association with an execution information entry indicating whether the authentication of an authentication target corresponding to the identification information entry has been executed; a second processor configured to update information content stored in the second memory; and a second communication interface configured to transmit and receive the information to and from each of the plurality of authentication apparatuses. The second processor updates, upon receiving, from one of the plurality of authentication apparatuses, a first identification information entry which is the identification information entry of an authentication target having undergone the authentication process of the first processor and a first execution information entry indicating that the authentication process has been executed, the execution information entry corresponding to the first identification information entry in the second memory, and stores a first sequence information entry indicating a sequence number in association with the first identification information entry in the second memory. The second communication interface transmits the first sequence information entry and the first identification information entry to the authentication apparatus from which the first identification information entry and the first execution information entry have been received. The first communication interface acquires, upon receiving the first sequence information entry from the management apparatus, a second execution information entry and a second sequence information entry stored in the second memory in association with a second identification information entry from the management apparatus, and stores, in the first memory, the second execution information entry and the second sequence information entry in association with the second identification information entry. The second identification information entry is identified based on a result obtained by comparing the first sequence information entry against a different sequence information entry received by the first communication interface prior to the reception of the first sequence information entry.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
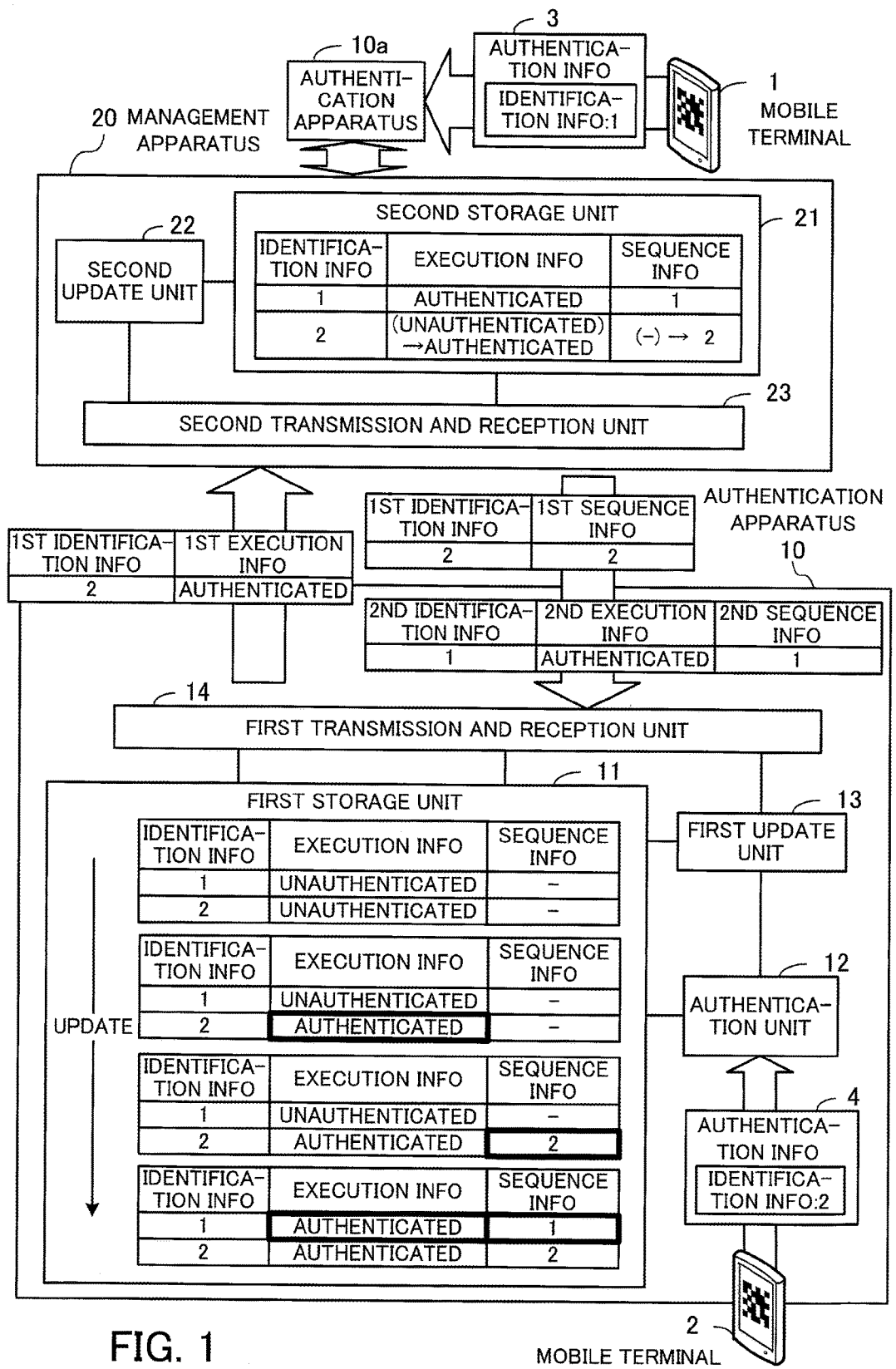
FIG. 1 illustrates an example of an authentication system according to a first embodiment.

Several embodiments will be described below with reference to the accompanying drawings, wherein like reference numerals refer to like elements throughout. Note that two or more of the embodiments below may be combined for implementation in such a way that no contradiction arises.

(a) First Embodiment

Next described is a first embodiment. FIG. 1 illustrates an example of an authentication system according to the first embodiment. The authentication system includes a plurality of authentication apparatuses and 10a, and a management apparatus 20. The authentication apparatuses 10 and 10a acquire credentials 3 and 4, respectively, of authentication targets from the mobile terminals 1 and 2, and then perform authentication processes. The management apparatus 20 manages results of the authentication carried out by the authentication apparatuses 10 and 10a.

The authentication apparatus 10 includes first storage unit 11, authentication unit 12, first update unit 13, and first transmission and reception unit 14. The first storage unit 11 stores therein an identification information entry of each authentication target in association with an execution information entry indicating whether authentication of the authentication target has been carried out. The authentication unit 12 receives a credential including the identification information entry of an authentication target, and executes an authentication process of the authentication target. The first update unit 13 updates information stored in the first storage unit 11. The first transmission and reception unit 14 transmits and receives information to and from the management apparatus 20. Note that the authentication apparatus 10a is provided with the same functions as those of the authentication apparatus 10.

The management apparatus 20 includes second storage unit 21, second update unit 22, and second transmission and reception unit 23. The second storage unit 21 stores therein an identification information entry of each authentication target in association with a corresponding execution information entry. The execution information entry indicates whether authentication of the authentication target has been carried out. The second update unit 22 updates information stored in the second storage unit 21. The second transmission and reception unit 23 transmits and receives information to and from each of the authentication apparatuses 10 and 10a.

In cooperation with each other, the authentication apparatuses 10 and 10a and the management apparatus 20 having the above-described functions perform synchronization processing to exchange the latest authentication execution information entries. Assume, for example, that the authentication apparatus 10 performs authentication involving the mobile terminal 2 after the authentication apparatus 10a having acquired the credential 3 from the mobile terminal 1 performs an authentication process of a target with an identification information entry with "1". First, the authentication unit of the authentication apparatus 10 acquires the credential 4 from the mobile terminal 2. The credential 4 includes an identification information entry with "2". The authentication unit 12 determines the validity of the credential 4. In addition, referring to the first storing unit 11, the authentication unit 12 checks that the execution information entry of an authentication target with the identification information entry with "2" indicates "unauthenticated". If the credential 4 is valid and the authentication target corresponding to the identification information entry with "2" is unauthenticated, the authentication unit 12 authenticates the user of the mobile terminal 2 as valid.

Next, in response to the execution of the authentication process by the authentication unit 12, the first update unit 13 updates, within the first storage unit 11, the execution information entry (first execution information entry) corresponding to the identification information entry (first identification information entry) of the target subjected to the authentication process. For example, the first update unit 13 changes the first execution information entry from "unauthenticated" to "authenticated". Subsequently, the first transmission and reception unit 14 transmits the first identification information entry and the first execution information entry to the management apparatus 20.

Based on the first identification information entry and the first execution information entry, the second update unit 22 of the management apparatus 20 updates, within the second storage unit 21, an execution information entry corresponding to the first identification information entry so as to indicate that an authentication process has been executed for a target associated with the first identification information entry. Then, the second update unit 22 stores, in the second storage unit 21, a first sequence information entry indicating a sequence number in association with the first identification information entry. According to the example of FIG. 1, because the target corresponding to the identification information entry with "1" first underwent an authentication process, the sequence information entry associated with the first identification information entry (the identification information entry with "2") indicates "2". Subsequently, the second transmission and reception unit 23 transmits the first sequence information entry and the first identification information entry to the authentication apparatus 10 including the first transmission and reception unit 14 having transmitted the first identification information entry and the first execution information entry.

On the authentication apparatus 10 side, the first update unit 13 stores the first sequence information entry sent from the management apparatus 20 in the first storage unit 11, in association with the first identification information entry. Next, the first transmission and reception unit 14 compares the first sequence information entry with another sequence information entry received before the reception of the first sequence information entry. Based on the result of the comparison, the first transmission and reception unit identifies, as a second identification information entry, an identification information entry whose target has undergone an authentication process but its associated execution information entry has not been acquired from the management apparatus 20. Note that the comparison above may be performed by either one of the authentication apparatus 10 and the management apparatus 20.

For example, the first transmission and reception unit 14 extracts, amongst identification information entries stored in the second storage unit 21, an identification information entry associated with a sequence information entry having a value larger than the value of a sequence information entry received by the first transmission and reception unit 14 before the reception of the first sequence information entry but smaller than the value indicated by the first sequence information entry. The extracted identification information entry is identified as the second identification information entry. According to the example of FIG. 1, the second storage unit 21 stores therein identification information entries individually associated with sequence information entries with "1" and "2". On the other hand, the first sequence information entry indicates "2", and the first transmission and reception unit 14 did not receive a different sequence information entry before the reception of the first sequence information entry indicating "2". In this case, between the sequence information entries individually indicating "1" and "2", the first transmission and reception unit 14 selects, as the second identification information entry, the identification information entry indicating "1" associated with the sequence information entry indicating "1", which is smaller than the value "2" indicated by the first sequence information entry. The first transmission and reception unit 14 acquires, from the management apparatus 20, a second execution information entry and a second sequence information entry stored in the second storage unit 21 in association with the second identification information entry.

Then, the first update unit 13 stores, in the first storage unit 11, the acquired second execution information entry and second sequence information entry in association with the second identification information entry.

As has been described above, the management apparatus 20 manages the sequence of authentication processes executed by the plurality of authentication apparatuses 10 and 10a, and determines execution information entries yet to be acquired by each of the authentication apparatuses 10 and 10a based on comparison results of sequence information entries. Herewith, it is possible to improve the efficiency of the synchronization processing of execution information entries. That is, each of the authentication apparatuses 10 and 10a needs to acquire only yet-to-be-acquired execution information entries from the management apparatus 20, thus reducing the processing loads.

In addition, the system according to the first embodiment does not involve precise processing, such as setting the clock on each of the authentication apparatuses 10 and 10a in an accurate manner, which simplifies the entire synchronization processing and facilitates addition of the authentication apparatuses 10 and 10a. For example, a method may be considered appropriate in which, in order to synchronize execution information entries among a plurality of authentication apparatuses, each authentication apparatus records the execution time each time it executes an authentication process, and the execution times of the authentication processes are then compared to determine one or more execution information entries associated with authentication processes executed after the execution of an authentication process associated with a previously acquired execution information entry. However, determining the yet-to-be-acquired execution information entries based on the execution times assumes that the clocks on all the authentication apparatuses are set in an accurate manner (for example, by the millisecond), and therefore involves rigorous management of the authentication apparatuses. The rigorous management of the authentication apparatuses entails the use of reliable communication technology, resulting in process complications. In turn, the process complications increase the time spent on set-up operations when a new authentication apparatus is installed or a failed authentication apparatus is replaced, which impedes a quick response to the situation. Compared to that, the system of the first embodiment compares sequence information entries to determine execution information entries yet to be acquired by the individual authentication apparatuses 10 and 10a, which eliminates the need for setting the clocks on the authentication apparatuses 10 and 10a in sync with each other and therefore simplifies the processing.

Note that the second update unit 22 of the management apparatus 20 is also able to detect an error, such as duplicate authentication. For example, upon receiving the first identification information entry and the first execution information entry from the first transmission and reception unit 14, the second update unit determines whether an execution information entry stored in the second storage unit 21 in association with the first identification information entry indicates that an authentication process has been executed. If the execution information entry indicates that an authentication process has been executed, the second update unit 22 stores error information in the second storage unit 21. In this manner, even if a single authentication target is authenticated twice due to a delay in the timing of synchronization of execution information entries among the authentication apparatuses and 10a, it is possible to quickly detect the occurrence of the duplicate authentication.

Note that the authentication unit 12, the first update unit 13, and the first transmission and reception unit 14 may be implemented, for example, by a processor of the authentication apparatus 10. The first storage unit 11 may be implemented, for example, by memory of the authentication apparatus 10. The second update unit 22 and the second transmission and reception unit 23 may be implemented, for example, by a processor of the management apparatus 20. The second storage unit 21 may be implemented, for example, by memory of the management apparatus 20.

In FIG. 1, each line connecting the individual components represents a part of communication paths, and communication paths other than those illustrated in FIG. 1 are also configurable.

(b) Second Embodiment

Figure 2:
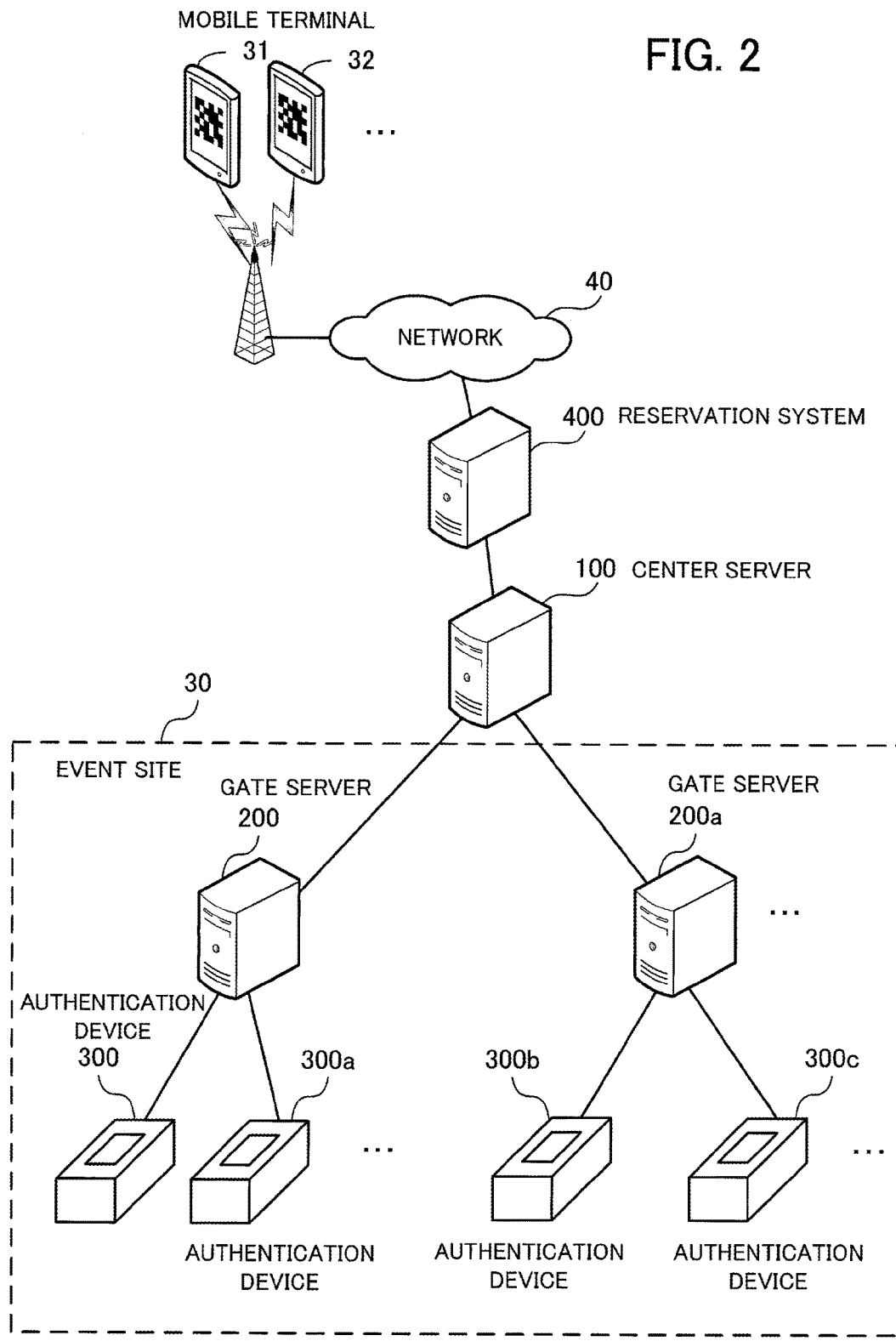
FIG. 2 illustrates an example of a system configuration according to a second embodiment.

Next described is a second embodiment. The second embodiment is directed to a system in which each of a plurality of gate servers compiles entry information collected by a plurality of authentication devices under the gate server, and a center server then compiles the entry information collected by the gate servers. FIG. 2 illustrates an example of a system configuration according to the second embodiment. An event site 30 is installed with a plurality of gate servers 200, 200a, and so on, each connected to a center server 100. To the individual gate servers 200, 200a, and so on, a plurality of authentication devices 300, 300a, 300b, 300c, and so on are connected. Note that the gate servers 200, 200a, and so on are examples of the management apparatus 20 of FIG. 1. In addition, the authentication devices 300, 300a, 300b, 300c, and so on are examples of the authentication apparatuses 10 and 10a of FIG. 1.

The center server 100 is connected to a reservation system 400, which handles reservations and ticket sales for an event. For example, the reservation system 400 accepts reservations for the event and receives payments for the admission from mobile terminals 31, 32, and so on connected to the reservation system 400 via a network 40. Then, the reservation system 400 transmits a credential, which is an electronic ticket, to each mobile terminal for which the payment for the admission has been confirmed. On the day of the event, each attendee carries his/her mobile terminal with the credential stored therein along to the event site 30, and is able to enter the event site 30 by allowing an authentication device to read the credential stored in the mobile terminal. In addition, the reservation system 400 transmits information of attendees who have made the reservations to the center server 100. For example, the reservation number or credential of each attendee is transmitted from the reservation system 400 to the center server 100. The center server 100 manages entry of attendees to the event site 30 in cooperation with the gate servers 200, 200a, and so on and the authentication devices 300, 300a, 300b, 300c, and so on.

Figure 3:
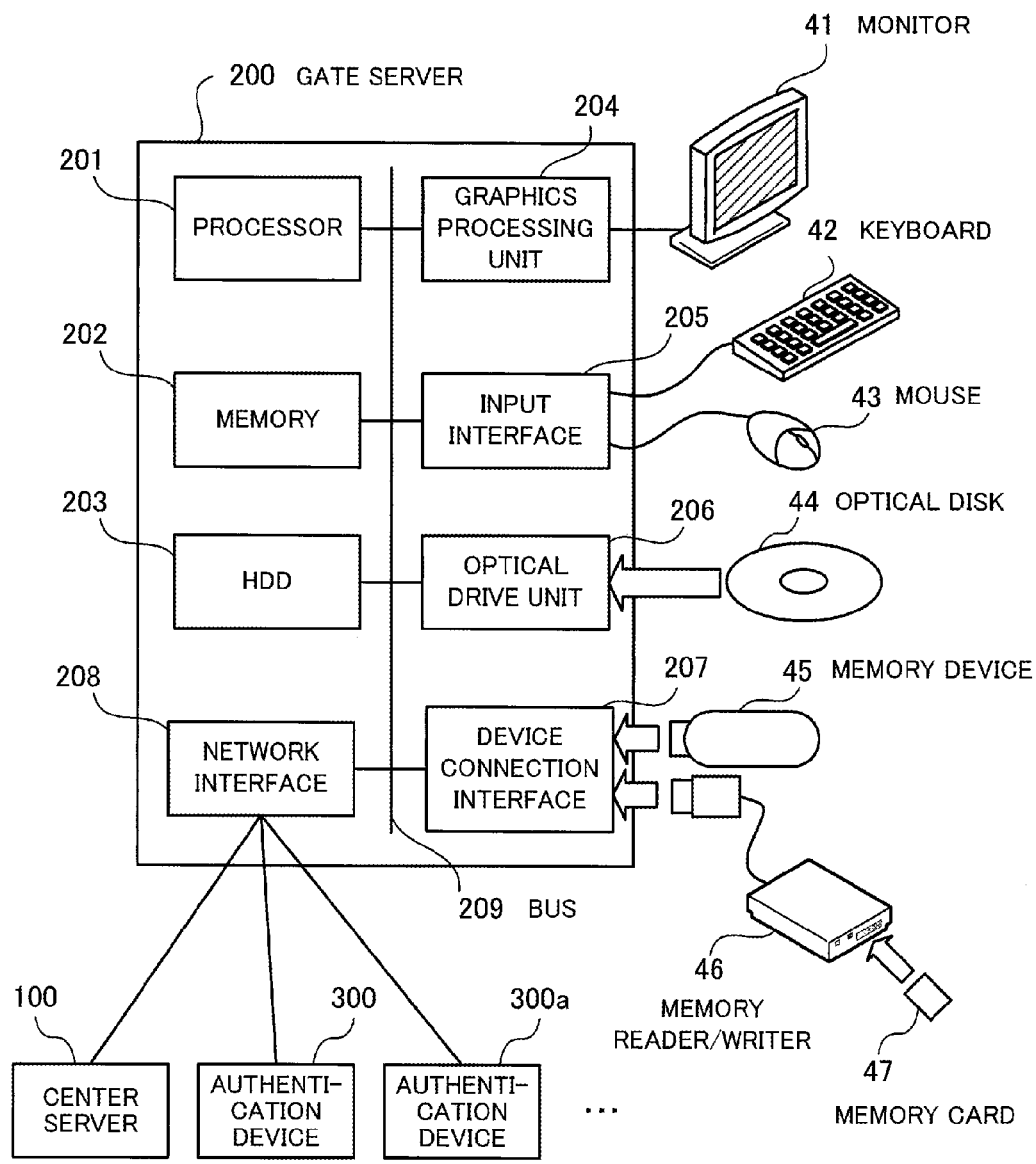
FIG. 3 illustrates an example of a hardware configuration of a gate server.

FIG. 3 illustrates an example of a hardware configuration of a gate server. Overall control of the gate server 200 is exercised by a processor 201. To the processor 201, memory 202 and a plurality of peripherals are connected via a bus 209. The processor 201 may be a multi-processor. The processor 201 is, for example, a central processing unit (CPU), a micro processing unit (MPU), or a digital signal processor (DSP). At least part of the functions implemented by executing a program by the processor 201 may be implemented as an electronic circuit, such as an application specific integrated circuit (ASIC) or a programmable logic device (PLD).

The memory 202 is used as a main storage device of the gate server 200. The memory 202 temporarily stores at least part of an operating system (OS) program and application programs to be executed by the processor 201. The memory 202 also stores therein various types of data to be used by the processor 201 for its processing. As the memory 202, a volatile semiconductor storage device such as random access memory (RAM) may be used.

The peripherals connected to the bus 209 include a hard disk drive (HDD) 203, a graphics processing unit 204, an input interface 205, an optical drive unit 206, a device connection interface 207, and a network interface 208. The HDD 203 magnetically writes and reads data to and from a built-in disk, and is used as a secondary storage device of the gate server 200. The HDD 203 stores therein the OS program, application programs, and various types of data. Note that a non-volatile semiconductor storage device such as flash memory may be used as a secondary storage device in place of the HDD 203.

To the graphics processing unit 204, a monitor 41 is connected. According to an instruction from the processor 201, the graphics processing unit 204 displays an image on a screen of the monitor 41. A cathode ray tube (CRT) display or a liquid crystal display, for example, may be used as the monitor 41. To the input interface 205, a keyboard 42 and a mouse 43 are connected. The input interface 205 transmits signals sent from the keyboard 42 and the mouse 43 to the processor 201. Note that the mouse 43 is just an example of pointing devices, and a different pointing device such as a touch panel, a tablet, a touch-pad, and a track ball, may be used instead.

The optical drive unit 206 reads data recorded on an optical disk 44 using, for example, laser light. The optical disk 44 is a portable storage medium on which data is recorded in such a manner as to be read by reflection of light. Examples of the optical disk 44 include a digital versatile disc (DVD), a DVD-RAM, a compact disk read only memory (CD-ROM), a CD recordable (CD-R), and a CD-rewritable (CD-RW). The device connection interface 207 is a communication interface for connecting peripherals to the gate server 200. To the device connection interface 207, for example, a memory device 45 and a memory reader/writer 46 may be connected. The memory device 45 is a storage medium having a function for communicating with the device connection interface 207. The memory reader/writer 46 is a device for writing and reading data to and from a memory card 47 which is a card type storage medium. The network interface 208 is connected to the center server 100 and the authentication devices 300, 300a, and so on via a network. Via the network, the network interface 208 transmits and receives data to and from the center server 100 and the authentication devices 300, 300a, and so on.

The hardware configuration described above achieves the processing functions of the gate server 200 according to the second embodiment. Note that FIG. 3 illustrates the hardware configuration of the gate server 200; however, each of the rest of the gate servers 200a and so on, the center server 100, and the reservation system 400 may be built with the same hardware configuration as the gate server 200. In addition, the management apparatus 20 of the first embodiment may also be built with the same hardware configuration as the gate server 200 of FIG. 3.

The gate server 200 achieves the processing functions of the second embodiment, for example, by executing a program stored in a computer-readable storage medium. The program describing processing content to be implemented by the gate server 200 may be stored in various types of storage media. For example, the program to be executed by the gate server 200 may be stored in the HDD 203. Then, the processor 201 loads at least part of the program stored in the HDD 203 into the memory 202 and then runs the program. In addition, the program to be executed by the gate server 200 may be stored in a portable storage medium, such as the optical disk 44, the memory device 45, and the memory card 47. The program stored in the portable storage medium becomes executable after being installed on the HDD 203, for example, under the control of the processor 201. Alternatively, the processor 201 may run the program by directly reading it from the portable storage medium.

Figure 4:
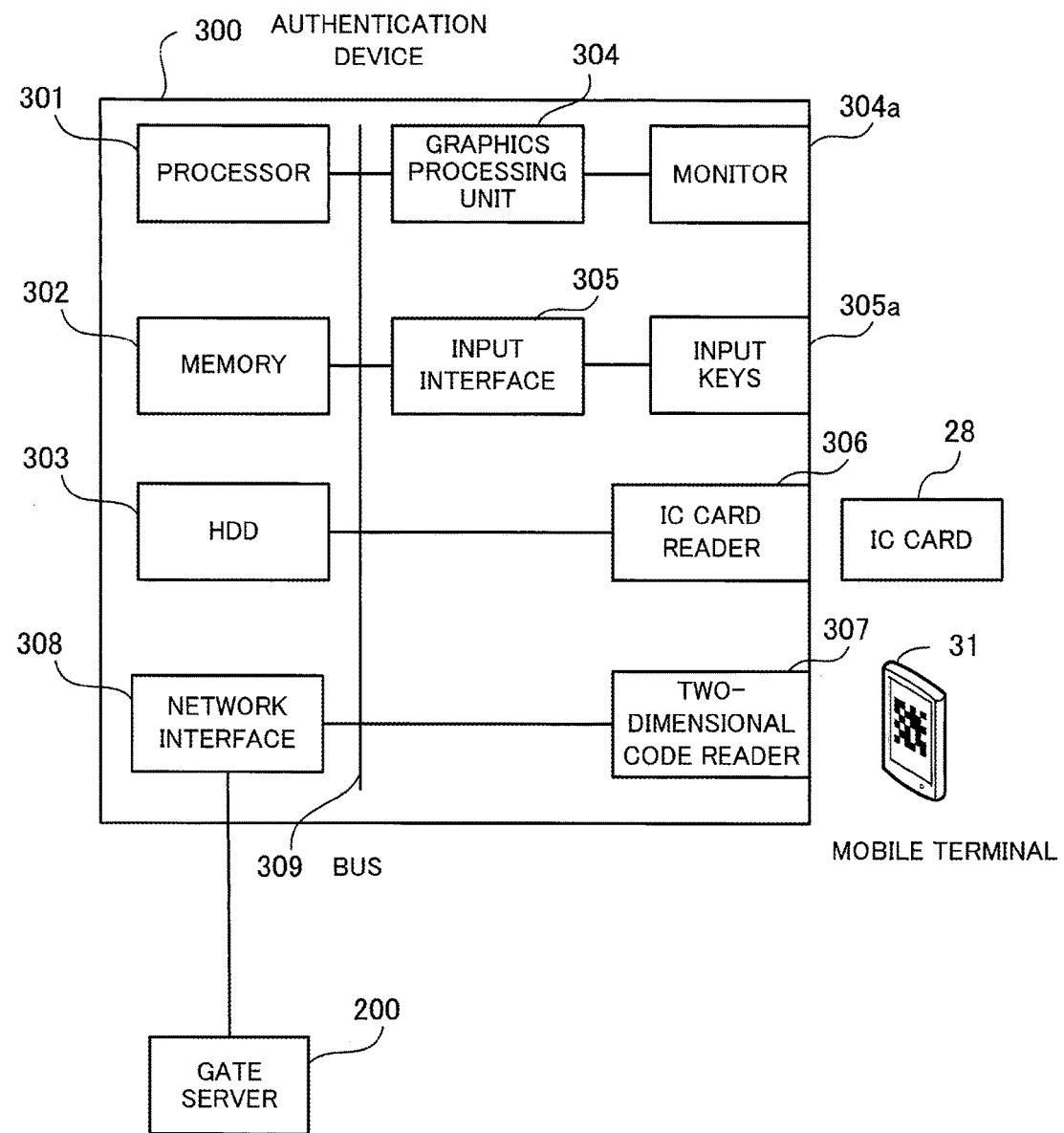
FIG. 4 illustrates an example of a hardware configuration of an authentication device.

FIG. 4 illustrates an example of a hardware configuration of an authentication device. Overall control of the authentication device 300 is exercised by a processor 301. To the processor 301, memory 302 and a plurality of peripherals are connected via a bus 309. The processor 301 may be a multi-processor. The processor 301 is, for example, a CPU, a MPU, or a DSP. At least part of the functions implemented by executing a program by the processor 301 may be implemented as an electronic circuit, such as an ASIC or a PLD. The memory 302 is used as a main storage device of the authentication device 300. The memory 302 temporarily stores at least part of an OS program and application programs to be executed by the processor 301. The memory 302 also stores therein various types of data to be used by the processor 301 for its processing. As the memory 302, a volatile semiconductor storage device such as RAM may be used.

The peripherals connected to the bus 309 include a HDD 303, a graphics processing unit 304, an input interface 305, an IC card reader 306, a two-dimensional code reader 307, and a network interface 308. The HDD 303 magnetically writes and reads data to and from a built-in disk, and is used as a secondary storage device of the authentication device 300. The HDD 303 stores therein the OS program, application programs, and various types of data. Note that a non-volatile semiconductor storage device such as flash memory may be used as a secondary storage device in place of the HDD 303.

To the graphics processing unit 304, a monitor 304a is connected. According to an instruction from the processor 301, the graphics processing unit 304 displays an image on a screen of the monitor 304a. A liquid crystal display, for example, may be used as the monitor 304a. To the input interface 305, input keys 305a are connected. The input interface 305 transmits, to the processor 301, signals sent from the input keys 305a. The IC card reader 306 reads information stored in an IC card 28 that comes directly or indirectly in contact with the IC card reader 306. For example, the IC card reader 306 reads a credential stored in the IC card 28. The IC card reader 306 transmits information read from the IC card 28 to the processor 301.

The two-dimensional code reader 307 reads a two-dimensional code and acquires information included in the two-dimensional code. For example, the two-dimensional code reader 307 captures an image of a two-dimensional code displayed on the mobile terminal 31 by a camera, and acquires a credential or the like included in the two-dimensional code from the image. The network interface 308 is connected to the gate server 200 via a network. The network interface 308 transmits and receives data to and from the gate server 200 via the network.

The hardware configuration described above achieves the processing functions of the authentication device 300 according to the second embodiment. Note that FIG. 4 illustrates the hardware configuration of the authentication device 300; however, each of the authentication devices 300a, 300b, 300c, and so on may be built with the same hardware configuration as that of the authentication device 300. In addition, the authentication apparatus 10 of the first embodiment may also be built with the same hardware configuration as that of the authentication device 300 of FIG. 4.

Figure 5:
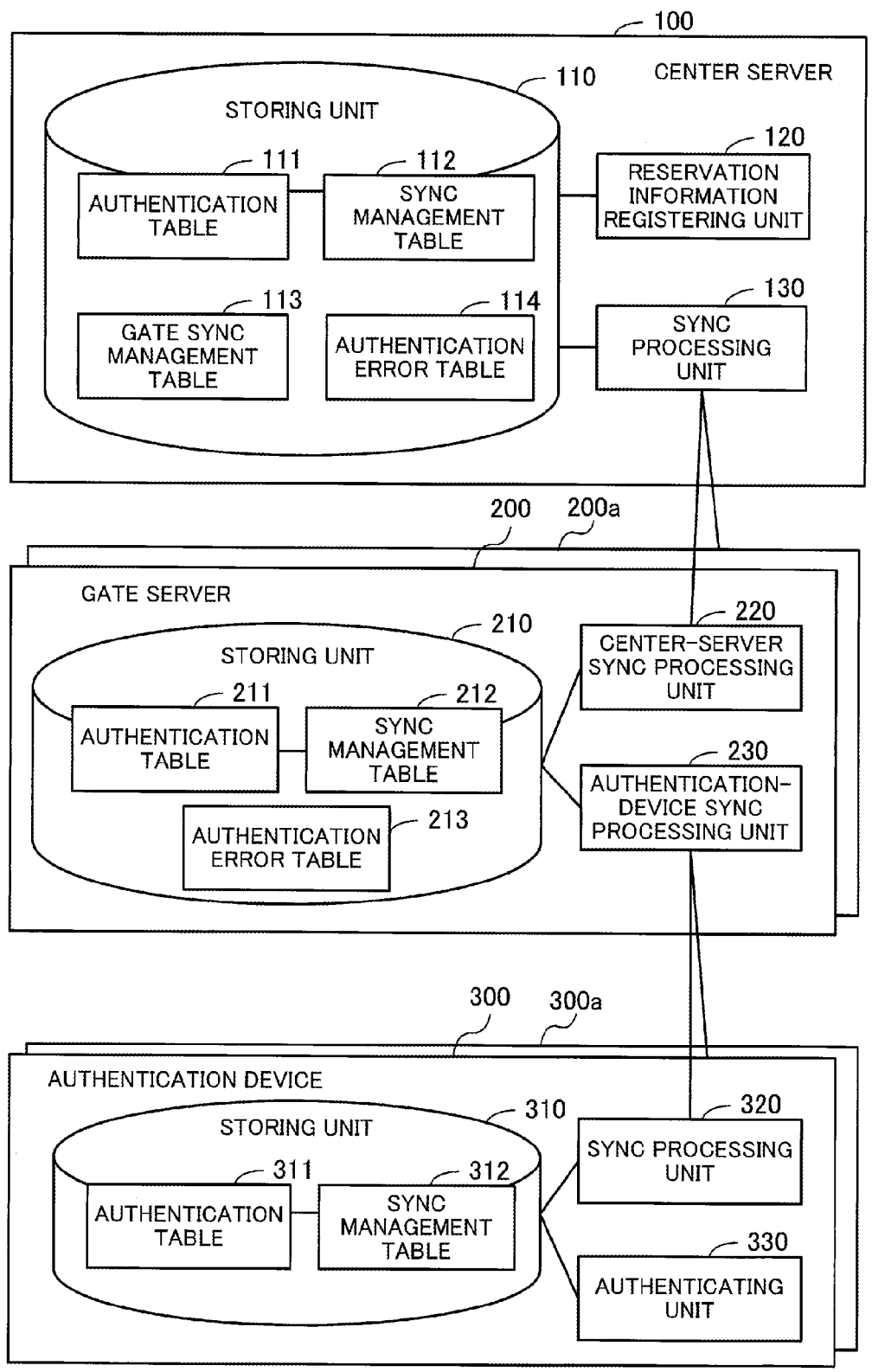
FIG. 5 is a block diagram illustrating functions of individual apparatuses.

FIG. 5 is a block diagram illustrating functions of individual apparatuses. The center server 100 includes a storing unit 110, a reservation information registering unit 120, and a synchronization processing unit 130. The storing unit 110 stores therein an authentication table 111, a synchronization management table 112, a gate synchronization management table 113, and an authentication error table 114. The authentication table 111 is a data table for managing whether each attendee having a reservation for the event has entered the event site 30. The synchronization management table 112 is a data table for managing an identification number (synchronization number B) of the latest synchronization process carried out between the center server 100 and one of the gate servers 200, 200a, and so on. The synchronization number B is counted up each time a synchronization process is performed between the center server 100 and one of the gate servers 200, 200a, and so on. The gate synchronization management table 113 is a data table for managing an identification number (synchronization number B) of the latest synchronization process carried out between the center server 100 and each of the gate servers 200, 200a, and so on. The authentication error table 114 is a data table for managing information on errors having occurred during authentication. The reservation information registering unit 120 acquires the latest reservation information from the reservation system 400, and registers it in the authentication table 111. The synchronization processing unit 130 communicates with the gate servers 200, 200a, and so on to carry out synchronization processes to update the information on whether each attendee has entered the event site 30.

The gate server 200 includes a storing unit 210, a center-server synchronization processing unit 220, and an authentication-device synchronization processing unit 230. The storing unit 210 includes an authentication table 211, a synchronization management table 212, and an authentication error table 213. The authentication table 211 is a data table for managing whether each attendee having a reservation for the event has entered the event site 30. The synchronization management table 212 is a data table for managing an identification number (synchronization number A) of the latest synchronization process carried out between the gate server 200 and one of the authentication devices 300, 300a, and so on. The synchronization number A is counted up each time a synchronization process is performed between the gate server 200 and one of the authentication devices 300, 300a, and so on. The authentication error table 213 is a data table for managing information on errors having occurred during authentication. The center-server synchronization processing unit 220 communicates with the center server 100 to carry out a synchronization process to update the information on whether each attendee has entered the event site 30. The authentication-device synchronization processing unit 230 communicates with the plurality of authentication devices 300, 300a, and so on to carry out synchronization processes to update the information on whether each attendee has entered the event site 30.

The rest of the gate servers 200a and so on individually have the same functions as those of the gate server 200.

The authentication device 300 includes a storing unit 310, a synchronization processing unit 320, and an authenticating unit 330. The storing unit 310 stores therein an authentication table 311 and a synchronization management table 312. The authentication table 311 is a data table for managing whether each attendee having a reservation for the event has entered the event site 30. The synchronization management table 312 is a data table for managing a synchronization number of the latest synchronization process carried out by the authentication device 300. The synchronization processing unit 320 communicates with the gate server 200 to carry out a synchronization process to update the information on whether each attendee has entered the event site 30. The authenticating unit 330 carries out an authentication process of each attendee before allowing the attendee to enter the event site 30.

In FIG. 5, each line connecting the individual components represents a part of communication paths, and communication paths other than those illustrated in FIG. 5 are also configurable. Further, the function of each component illustrated in FIG. 5 is implemented, for example, by causing a computer to execute a program module corresponding to the component.

The relationship between the functional elements of each apparatus of FIG. 5 and those of the first embodiment of FIG. 1 is as follows. The storing unit 210 of the gate server 200 is an example of the storage unit 21 of the management apparatus 20 illustrated in FIG. 1. In addition, the authentication-device synchronization processing unit 230 is an example of an element incorporating the second update unit 22 and the second transmission and reception unit 23 of the management apparatus 20. The storing unit 310 of the authentication device 300 is an example of the first storage unit 11 of the authentication apparatus 10 illustrated in FIG. 1. The synchronization processing unit 320 of the authentication device 300 is an example of an element incorporating the first update unit 13 and the first transmission and reception unit 14 of the authentication apparatus 10. The authenticating unit 330 of the authentication device 300 is an example of the authentication unit 12 of the authentication apparatus 10.

Figure 6:
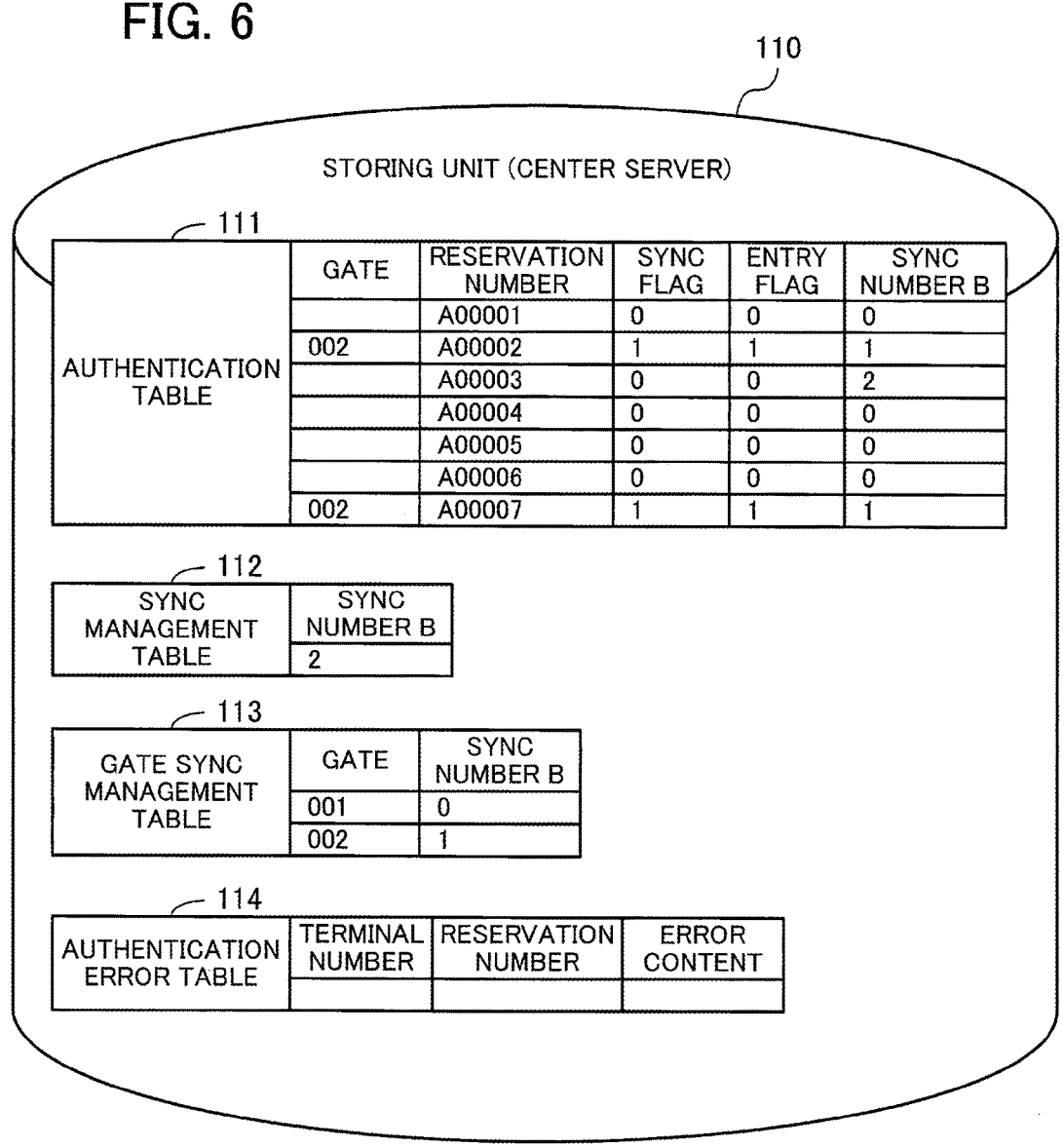
FIG. 6 illustrates an example of information stored in a storing unit of a center server.
Figure 7:
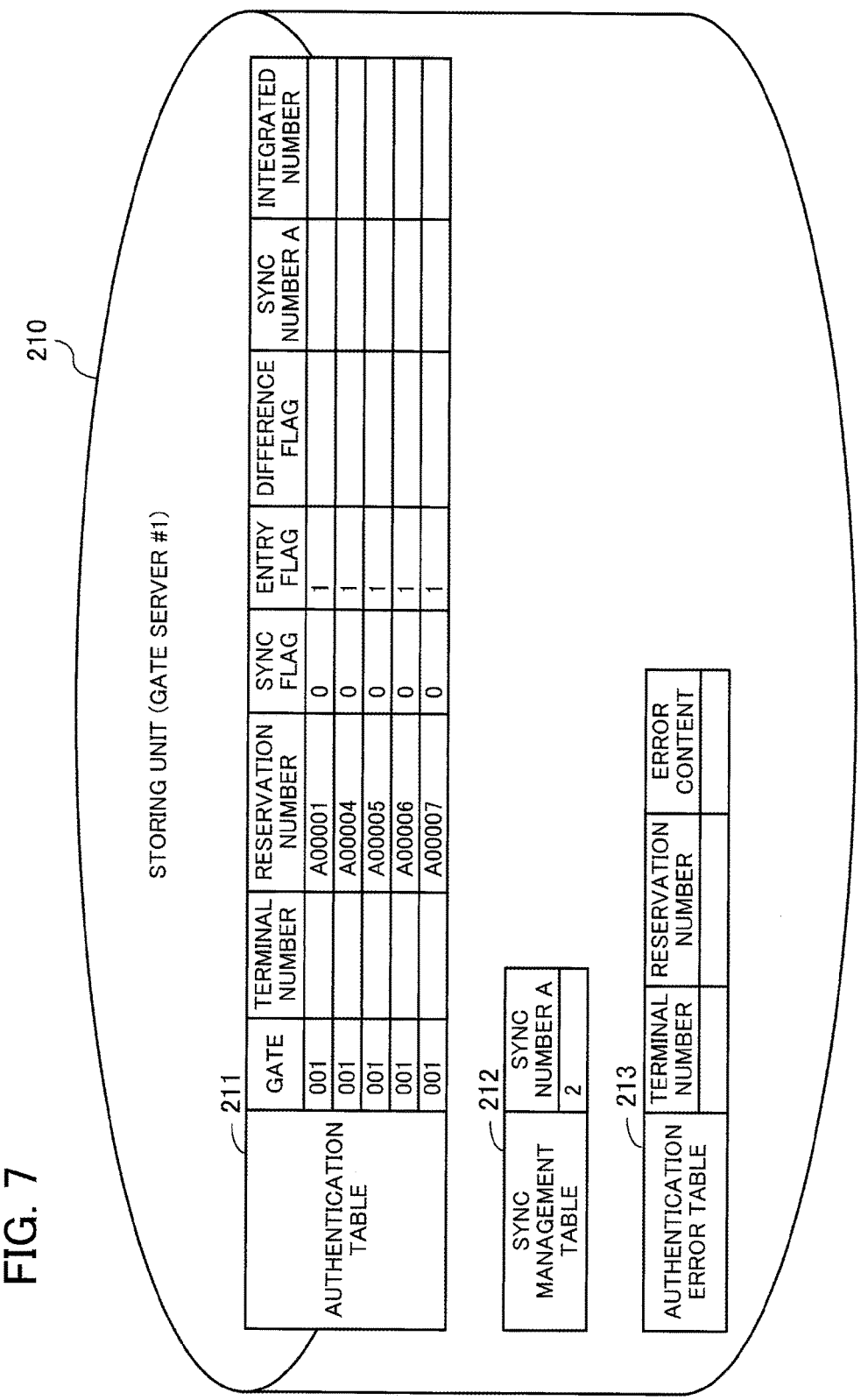
FIG. 7 illustrates an example of information stored in a storing unit of the gate server.
Figure 8:
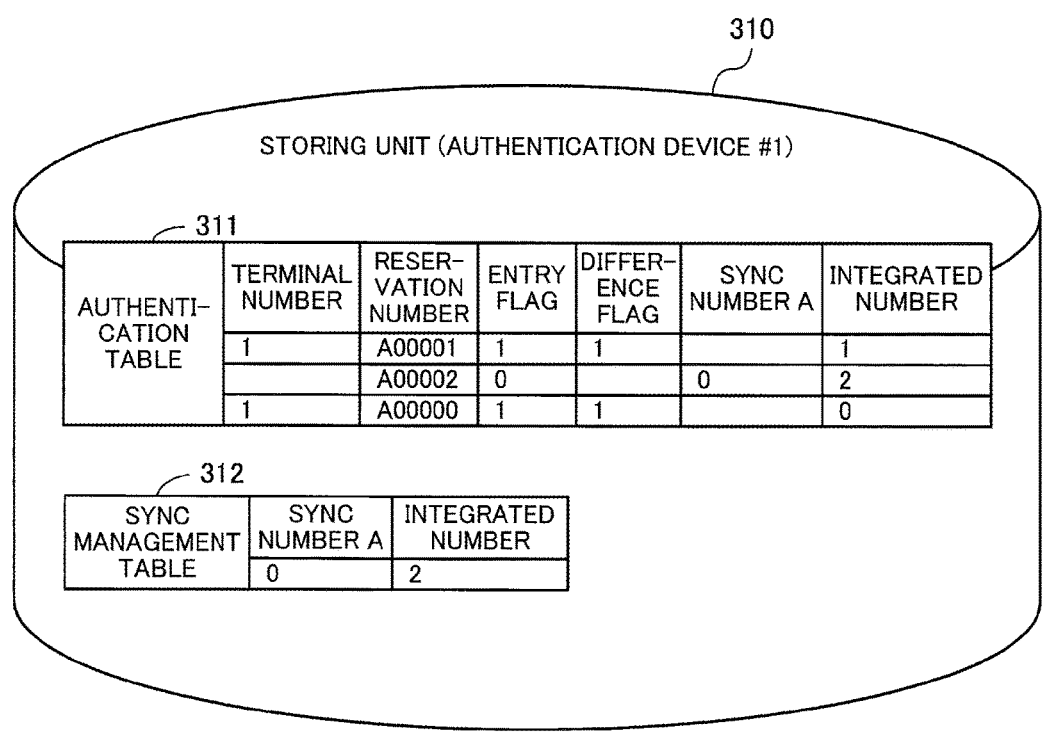
FIG. 8 illustrates an example of information stored in a storing unit of the authentication device.

With reference to FIGS. 6 to 8, the following gives specific examples of information stored in the storing unit of each apparatus. FIG. 6 illustrates an example of information stored in the storing unit of the center server. In the authentication table 111, records of individual reservations made by anticipated attendees are registered. The authentication table 111 includes columns of the following items: gate; reservation number; synchronization flag; entry flag; and synchronization number B. Each field in the gate column contains the identifier of a gate server (gate identification) corresponding to a gate through which a corresponding attendee passed to enter the event site 30. Each field in the reservation number column contains the identification number (reservation number) of a reservation for the event. Each field in the synchronization flag column contains the flag (synchronization flag) indicating whether a synchronization process between the center server 100 and a gate server has been performed for the corresponding reservation. The synchronization flag is set to "0" when the synchronization process has yet to be performed, and the synchronization flag is set to "1" when the synchronization process has been performed. Each field in the entry flag column contains the flag (entry flag) indicating whether an attendee having made the corresponding reservation has entered the event site 30.

The entry flag is set to "0" when the attendee has yet to enter the event site 30, and the entry flag is set to "1" when the attendee has entered the event site 30. Each field in the synchronization number B column contains the identification number of a synchronization process (synchronization number B) between the center server 100 and a corresponding one of the gate servers 200, 200a, and so on performed to update the corresponding entry flag.

Note that in the case of registering a new reservation record, the reservation information registering unit 120 adds 1 to the value of the synchronization number B in the synchronization management table 112, and inserts the record having the value obtained after the addition as its synchronization number B into the authentication table 111. This allows the record representing a new reservation to be included in difference data (to be described later) at the time of generating the difference data. Note that the synchronization flag of each record representing a new reservation is set to "0" when the record is inserted into the authentication table 111.

What is registered in the synchronization management table 112 is the identification number of the latest synchronization process (synchronization number B) carried out between the center server 100 and one of the gate servers 200, 200a, and so on.

The gate synchronization management table 113 includes columns of gate and synchronization number B. Each field in the gate column contains the identification number (gate number) of a gate server. Each field in the synchronization number B column contains the identification number of the latest synchronization process (synchronization number B) carried out between the center server 100 and the corresponding gate server. According to the example of FIG. 6, the synchronization number B of the gate server 200 with gate number "001" is "0", which indicates that the gate server 200 has not yet completed a synchronization process with the center server 100. The synchronization number B of a gate server with gate number "002" is "1", which indicates that the gate server with gate number "002" has completed a synchronization process with the center server 100 with respect to each record whose synchronization number B has a value of "1" or less.

The authentication error table 114 includes columns of terminal number; reservation number; and error content. Each field in the terminal number column contains the identification number of an authentication device (terminal number) having detected an authentication error. Each field in the reservation number column contains the reservation number of a reservation for which the corresponding authentication error was detected. Each field in the error content column contains the content of the corresponding detected authentication error.

FIG. 7 illustrates an example of information stored in the storing unit of the gate server. In the authentication table 211, records of individual reservations made by anticipated attendees are registered. The authentication table 211 includes columns of the following items: gate; terminal number; reservation number; synchronization flag; entry flag; difference flag; synchronization number A; and integrated number. Each field in the gate column contains the identification number of the gate server 200 (gate number). Each field in the terminal number column contains the terminal number of an authentication device which has authenticated the corresponding reservation. Each field in the reservation number column contains the identification number of the corresponding reservation (reservation number). Each field in the entry flag column contains the flag (entry flag) indicating whether an attendee having made the corresponding reservation has entered the event site 30. Each field in the difference flag column contains a flag (difference flag) indicating whether a synchronization process needs to be performed for the corresponding record between the gate server 200 and the corresponding one of the authentication devices 300, 300a, and so on. The difference flag is set to "1" when the record is subject to a synchronization process. On the other hand, the difference flag is set to "2" when the record has already undergone a synchronization process and is therefore no longer a target of a synchronization process. Each field in the synchronization number A column contains the identification number of a synchronization process (synchronization number A) performed between the gate server 200 and a different one of the authentication devices 300, 300a, and so on. Each field in the integrated number column contains the serial number of the corresponding record (integrated number) registered in the authentication table 211.

What is registered in the synchronization management table 212 is the identification number of the latest synchronization process (synchronization number A) carried out between the gate server 200 and one of the authentication devices 300, 300a, and so on.

The authentication error table 213 includes columns of the following items: terminal number; reservation number; and error content. Each column of the authentication error table 213 contains information similar to that contained in a column with the same name in the authentication error table 114 stored in the storing unit 110 of the center server 100.

FIG. 8 illustrates an example of information stored in the storing unit of the authentication device. In the authentication table 311, records of individual reservations made by anticipated attendees are registered. The authentication table 311 includes columns of the following items: terminal number; reservation number; entry flag; difference flag; synchronization number A; and integrated number. Each column of the authentication table 311 contains information similar to that contained in a column with the same name in the authentication table 211 stored in the storing unit 210 of the gate server 200.

The synchronization management table 312 includes columns of synchronization number and integrated number. Each field in the synchronization number column contains the identification number of the latest synchronization process (synchronization number A) carried out between the authentication device 300 and the gate server 200.

With the information described above, synchronization processes are carried out between the center server 100 and each of the gate servers 200, 200a, and so on, as well as between each of the gate servers 200, 200a, and so on and each of its corresponding authentication devices 300, 300a, 300b, 300c, and so on.

Figure 9:
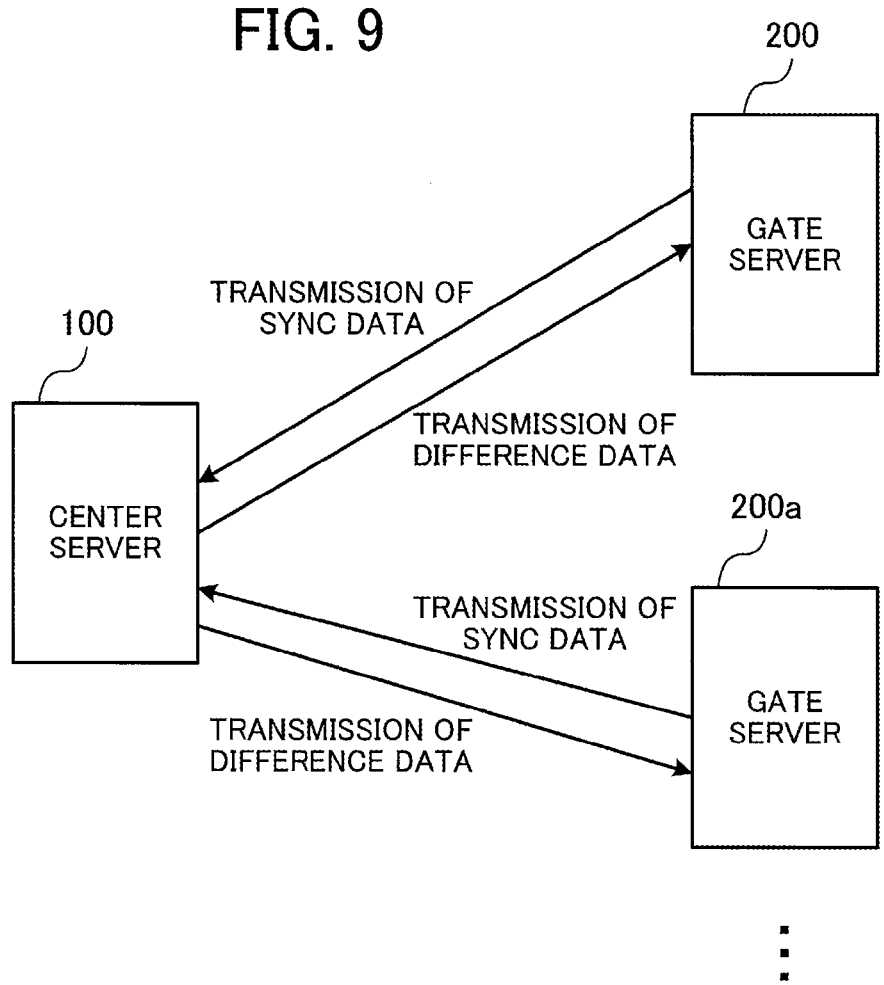
FIG. 9 illustrates an outline of synchronization processes between the center server and gate servers.

First, synchronization processes between the center server 100 and the gate servers 200, 200a, and so on are described in detail. FIG. 9 illustrates an outline of synchronization processes between the center server and gate servers. Synchronization data is transmitted from each of the gate servers 200, 200a, and so on to the center server 100. The synchronization data includes, amongst records registered in the authentication table of each of the gate servers 200, 200a, and so on, records of reservations made by attendees who have entered the event site 30 after the execution of the previous synchronization process. Difference data is transmitted from the center server 100 to each of the gate servers 200, 200a, and so on. The difference data includes, amongst records registered in the authentication table 111 of the center server 100, records updated and newly added after the previous synchronization process carried out between the center server 100 and a gate server to which the difference data is to be transmitted.

Figure 10:
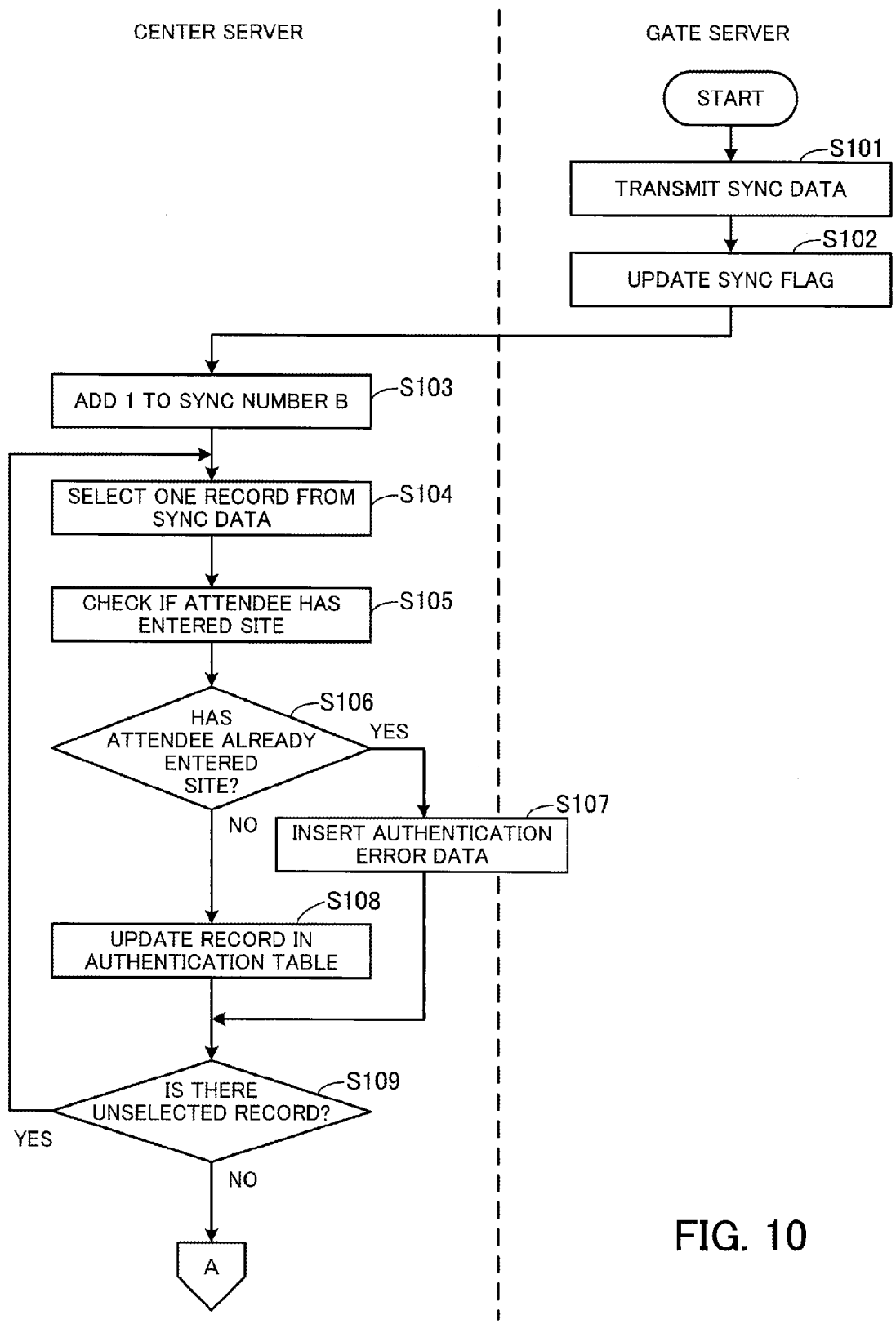
FIG. 10 is a first half of a flowchart illustrating a procedure of a synchronization process between the center server and the gate server.

By exchanging such synchronization data and difference data, information in the authentication tables is synchronized between the center server 100 and each of the gate servers 200, 200*a*, and so on. FIG. 10 is a first half of a flowchart illustrating a procedure of a synchronization process between the center server and the gate server. The following describes a synchronization process carried out between the center server 100 and the gate server 200; however, a similar process takes place between the center server 100 and each of the rest of the gate servers 200*a* and so on. In FIG. 10, a procedure executed by the center server 100 is illustrated on the left-hand side, and a procedure executed by the gate server 200 is illustrated on the right-hand side.

[Step S101] At a predetermined time to start a synchronization process, the center-server synchronization processing unit 220 of the gate server 200 transmits synchronization data to the center server 100. For example, the gate server 200 starts a synchronization process with a predetermined period of time (for example, at intervals of 30 seconds). Specifically, the center-server synchronization processing unit 220 extracts, from the authentication table 211, one or more records whose entry flag is ON (i.e., the entry flag is set to "1") and which have yet to undergo a synchronization process with the center server 100 (the synchronization flag is set to "0"). Then, the center-server synchronization processing unit 220 generates synchronization data including the extracted records and transmits the synchronization data to the center server 100.

[Step S102] After transmitting the synchronization data, the center-server synchronization processing unit 220 updates, within the authentication table 211, the synchronization flag of each of the records included in the synchronization data to "1".

[Step S103] Upon receiving the synchronization data, the synchronization processing unit 130 of the center server 100 adds 1 to the value of the synchronization number B in the synchronization management table 112.

[Step S104] The synchronization processing unit 130 selects, amongst the records included in the synchronization data transmitted from the gate server 200, one record having not undergone steps S105 to S108.

[Step S105] The synchronization processing unit 130 checks whether, with reference to the authentication table 111 of the center server 100, a reservation represented by the selected record indicates that an attendee has already entered the event site 30. For example, the synchronization processing unit 130 searches the authentication table 111 for a record using the reservation number of the selected record. Then, based on the entry flag of the detected record, the synchronization processing unit 130 determines whether the attendee has already entered the event site 30.

[Step S106] The synchronization processing unit 130 determines whether the record detected in the authentication table 111 indicates that the attendee has already entered the event site 30. For example, if the entry flag of the corresponding record detected in the authentication table 111 is set to "0", the synchronization processing unit 130 determines that the attendee has yet to enter the event site 30. On the other hand, if the entry flag is set to "1", the synchronization processing unit 130 determines that the attendee has already entered the event site 30. When the synchronization processing unit 130 determines that the attendee has yet to enter the event site 30, the process moves to step S108. When the synchronization processing unit 130 determines that the attendee has already entered the event site 30, the process moves to step S107.

[Step S107] When the attendee has already entered the event site 30, the synchronization processing unit 130 inserts, into the authentication error table 114, authentication error data for the reservation represented by the selected record. For example, the synchronization processing unit 130 extracts the terminal number and reservation number from the selected record and adds error content indicating a "duplicate entry" to the extracted information, and then registers the information in the authentication error table 114. Subsequently, the process moves to step S109.

[Step S108] The synchronization processing unit 130 updates, within the authentication table 111, the record corresponding to the selected record. For example, the synchronization processing unit 130 extracts the gate number from the selected record. Then, the synchronization processing unit 130 sets the extracted gate number, within the gate column of the authentication table 111, in a field of the corresponding record. The synchronization processing unit 130 also changes, within the authentication table 111, the values of both the synchronization flag and the entry flag of the corresponding record to "1". Further, the synchronization processing unit 130 acquires the value of the synchronization number B from the synchronization management table 112, and sets the acquired value as the synchronization number B of the corresponding record in the authentication table 111.

[Step S109] The synchronization processing unit 130 determines whether, in the synchronization data, one or more records remain unselected. If one or more records remain unselected, the process moves to step S104. If no record in the synchronization data remains unselected, the process moves to step S111 (refer to FIG. 11).

Figure 11:
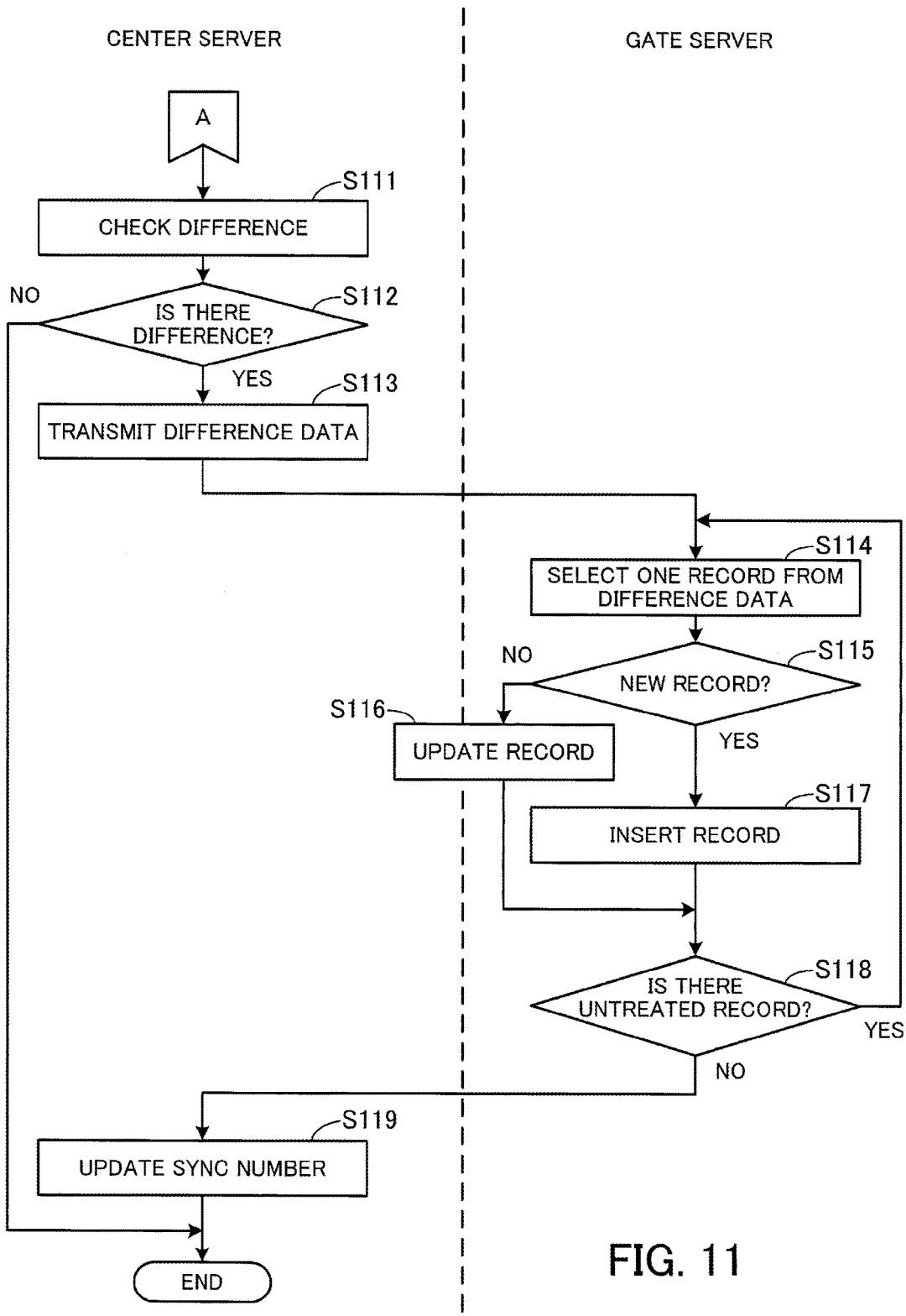
FIG. 11 is a second half of the flowchart illustrating the procedure of the synchronization process between the center server and the gate server.

FIG. 11 is a second half of the flowchart illustrating the procedure of the synchronization process between the center server and the gate server.

[Step S111] The synchronization processing unit 130 of the center server 100 checks a difference between the value of the synchronization number B of the center server 100 and that of the gate server 200. For example, the center server 100 compares the value of the synchronization number B in the synchronization management table 112 against the value of the synchronization number B of the gate server 200 registered in the gate synchronization management table 113.

[Step S112] If there is a difference in the values of the synchronization number B, the synchronization processing unit 130 proceeds to step S113. If not, the synchronization processing unit 130 ends the synchronization process.

[Step S113] When there is a difference in the values of the synchronization number B, the synchronization processing unit 130 transmits difference data to the gate server 200. For example, the synchronization processing unit 130 extracts, from the authentication table 111, one or more records whose value of the synchronization number B is larger than the value of the synchronization number B of the gate server 200 in the gate synchronization management table 113. Then, the synchronization processing unit 130 generates difference data including the extracted records and transmits the difference data to the gate server 200.

[Step S114] The center-server synchronization processing unit 220 of the gate server 200 selects, amongst the records included in the received difference data, one untreated record.

[Step S115] The center-server synchronization processing unit 220 determines whether the selected record is a new record. For example, the center-server synchronization processing unit 220 searches the authentication table 211 for a record corresponding to the reservation number of the selected record. If no record corresponding to the reservation number is found in the authentication table 211, the selected record is a new record. If the selected record is a new record, the process moves to step S117. If not, the process moves to step S116.

[Step S116] The center-server synchronization processing unit 220 updates the corresponding record in the authentication table 211 in accordance with the selected record. Subsequently, the process moves to step S118.

[Step S117] The center-server synchronization processing unit 220 inserts the selected record into the authentication table 211 as a new record.

[Step S118] The center-server synchronization processing unit 220 determines whether, in the difference data, one or more records remain untreated. If one or more records remain untreated, the process moves to step S114. If no record in the difference data remains untreated, the center-server synchronization processing unit 220 transmits a response indicating the completion of the synchronization process (hereinafter simply referred to as "synchronization process completion response") to the center server 100, and then the process moves to step S119.

[Step S119] Upon receiving the synchronization process completion response from the gate server 200, the synchronization processing unit 130 of the center server 100 updates the value of the synchronization number B of the gate server 200. For example, the synchronization processing unit 130 updates, within the gate synchronization management table 113, the value of the synchronization number B corresponding to the gate number of the gate server 200 to be the same as that set in the synchronization management table 112.

In the above-described manner, the synchronization process is carried out between the center server 100 and the gate server 200, and the center server 100 and the gate server 200 are able to update the information on whether each attendee has entered the event site 30 to the latest one in cooperation with each other. For example, assume that, at the start of the synchronization process, the information stored in the storing unit 110 of the center server 100 is as illustrated in FIG. 6, and the information stored in the storing unit 210 of the gate server 200 is as illustrated in FIG. 7.

Records of seven reservations are registered in the authentication table 111 of the center server 100 in FIG. 6, while records of five reservations are registered in the authentication table 211 of the gate server 200 in FIG. 7. As for each of records with reservation numbers "A00001", "A00004", "A00005", and "A00006", the entry flag is set to "1" but the synchronization flag is set to "0" in the gate server 200. Therefore, records in the center server 100 corresponding to these reservation numbers do not indicate that attendees have already entered the event site 30. Hence, in the synchronization process, these records are transmitted from the gate server 200 to the center server 100 and reflected in the authentication table 111 of the center server 100.

As for records with reservation numbers "A00002" and "A00003", these records are registered in the authentication table 111 of the center server 100, but not registered in the authentication table 211 of the gate server 200. Of them, the record with the reservation number "A00002" represents a reservation updated by synchronization between the center server 100 and a gate server with a gate number "002", to indicate that the attendee has already entered the event site 30. The content of the record is reflected in the authentication table 211 of the gate server 200 with a gate number "001" by the synchronization process. The record with the reservation number "A00003" represents a new reservation. The content of the record is also reflected in the authentication table 211 of the gate server 200 with the gate number "001" by the synchronization process.

The record with a reservation number "A00007" represents, on the center server 100 side, a reservation already updated in synchronization between the center server 100 and the gate server with the gate number "002", to indicate that the attendee has already entered the event site 30. However, the corresponding record on the gate server 200 side also represents a reservation indicating that the attendee has already entered the event site 30. On the gate server 200 side, the record has not undergone synchronization, and is therefore transmitted from the gate server 200 to the center server 100 as synchronization data in the synchronization process. However, because the record on the center server 100 side indicates that it has already undergone synchronization, the record is going to be recorded as a "duplicate entry error".

Figure 12:
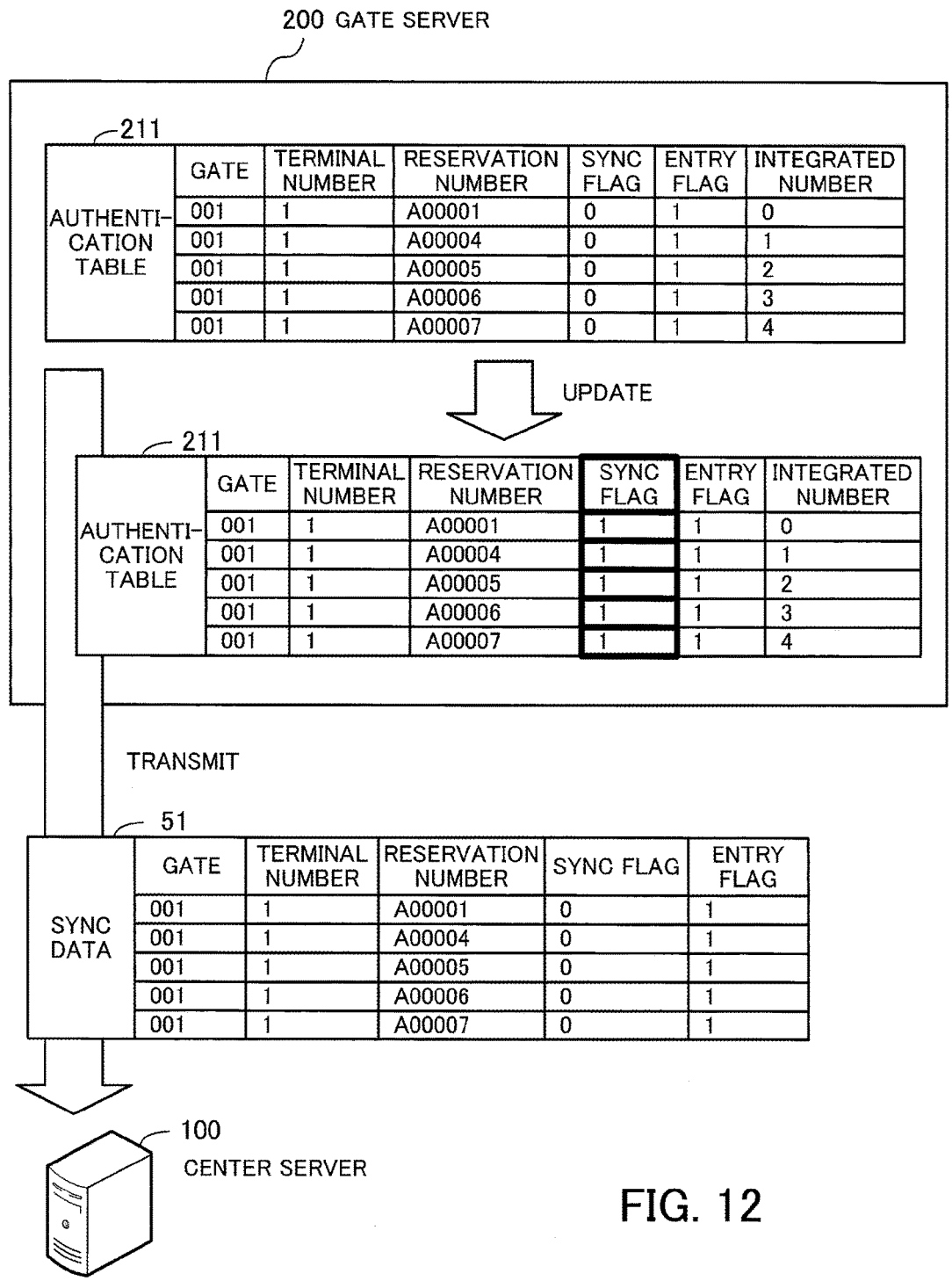
FIG. 12 is a first diagram illustrating an example of the synchronization process between the center server and the gate server.

Next described is a specific procedure of the synchronization process between the center server 100 and the gate server 200 having the above-described information, with reference to FIGS. 12 to 16. Note that FIGS. 12 to 16 omit information not used in the synchronization process with the center server 100 from the authentication table 211 of the gate server 200. FIG. 12 is a first diagram illustrating an example of a synchronization process between the center server and the gate server. When it comes to the time to start a synchronization process, one or more records whose entry flag and synchronization flag are set to "1" and "0", respectively, are extracted from the authentication table 211 of the gate server 200 as synchronization targets. Then, synchronization data 51 including the extracted records is generated and transmitted to the center server 100. Subsequently, the synchronization flag of each of the synchronization target records in the authentication table 211 is updated to "1".

Figure 13:
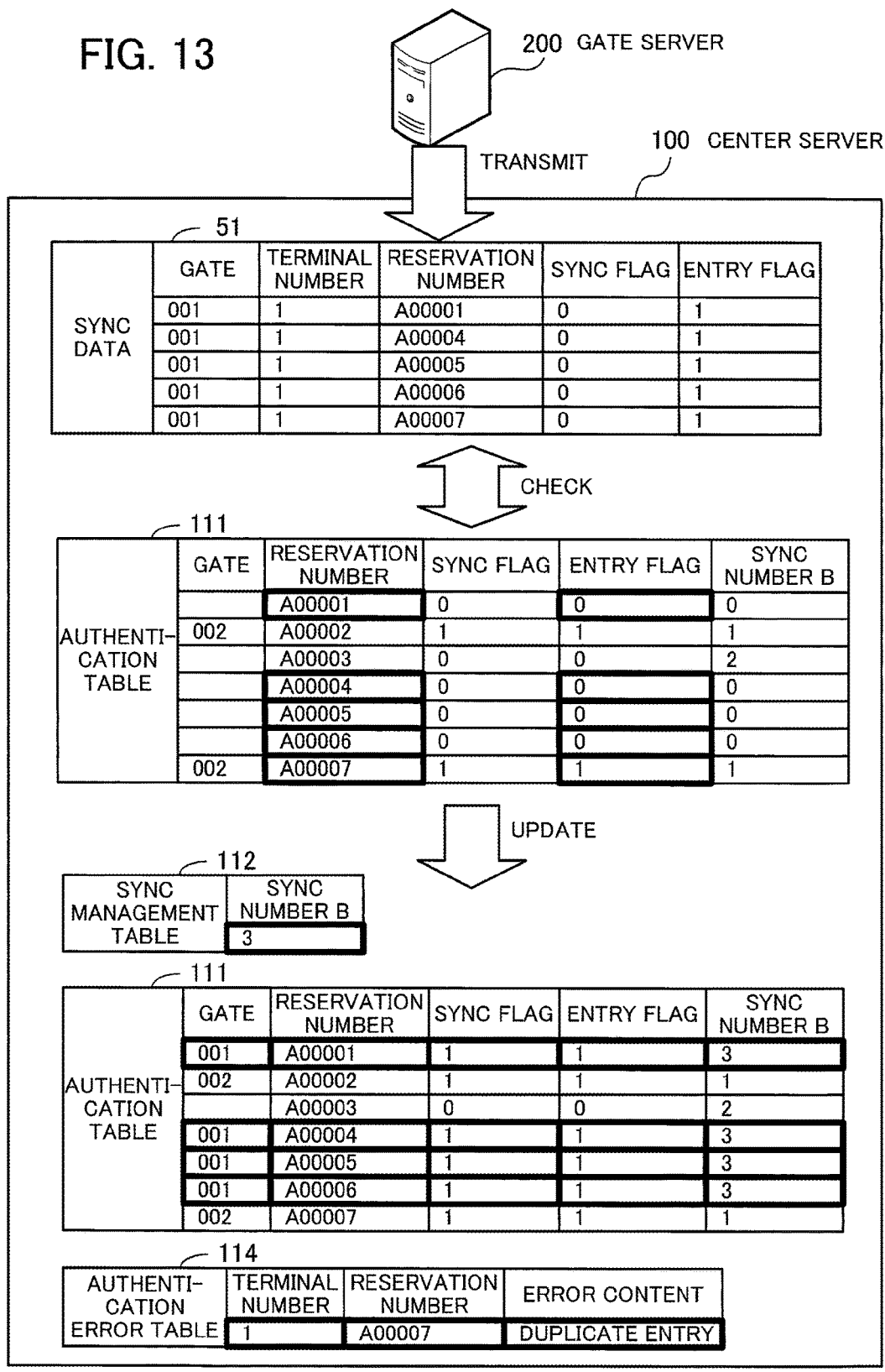
FIG. 13 is a second diagram illustrating the example of the synchronization process between the center server and the gate server.

FIG. 13 is a second diagram illustrating the example of the synchronization process between the center server and the gate server. Upon receiving the synchronization data 51, the center server 100 checks whether records corresponding to the synchronization target records included in the synchronization data 51 are registered in the authentication table 111. Subsequently, the content of the corresponding records in the authentication table 111 is updated in accordance with the records of the synchronization data 51. At this point, the value of the synchronization number B in the synchronization management table 112 is increased by 1, and the increased value of the synchronization number B is used as the value of the synchronization number B of each of the synchronization target records in the authentication table 111. According to the example of FIG. 13, as for each of the records with the reservation numbers "A00001", "A00004", "A00005", and "A00006", the entry flag and the synchronization number B are updated to "1" and "3", respectively.

As for the record with the reservation number "A00007", the entry flag is set to "1" before the reception of the synchronization data 51, indicating that the attendee has already entered the event site 30. Therefore, it is determined that a duplicate entry has taken place, and error information is registered in the authentication error table 114. According to the example of FIG. 13, error information is registered with the terminal number "1", the reservation number "A00007", and the error content "duplicate entry".

The registration of the error information in the authentication error table 114 allows an administrator of the system to recognize the occurrence of a fraudulent entry. For example, when new error information is registered in the authentication error table 114, the center server 100 may display a message indicating the occurrence of an error on a monitor of the center server 100, or may send, to the administrator, information indicating the occurrence of an error, for example, by e-mail.

Figure 14:
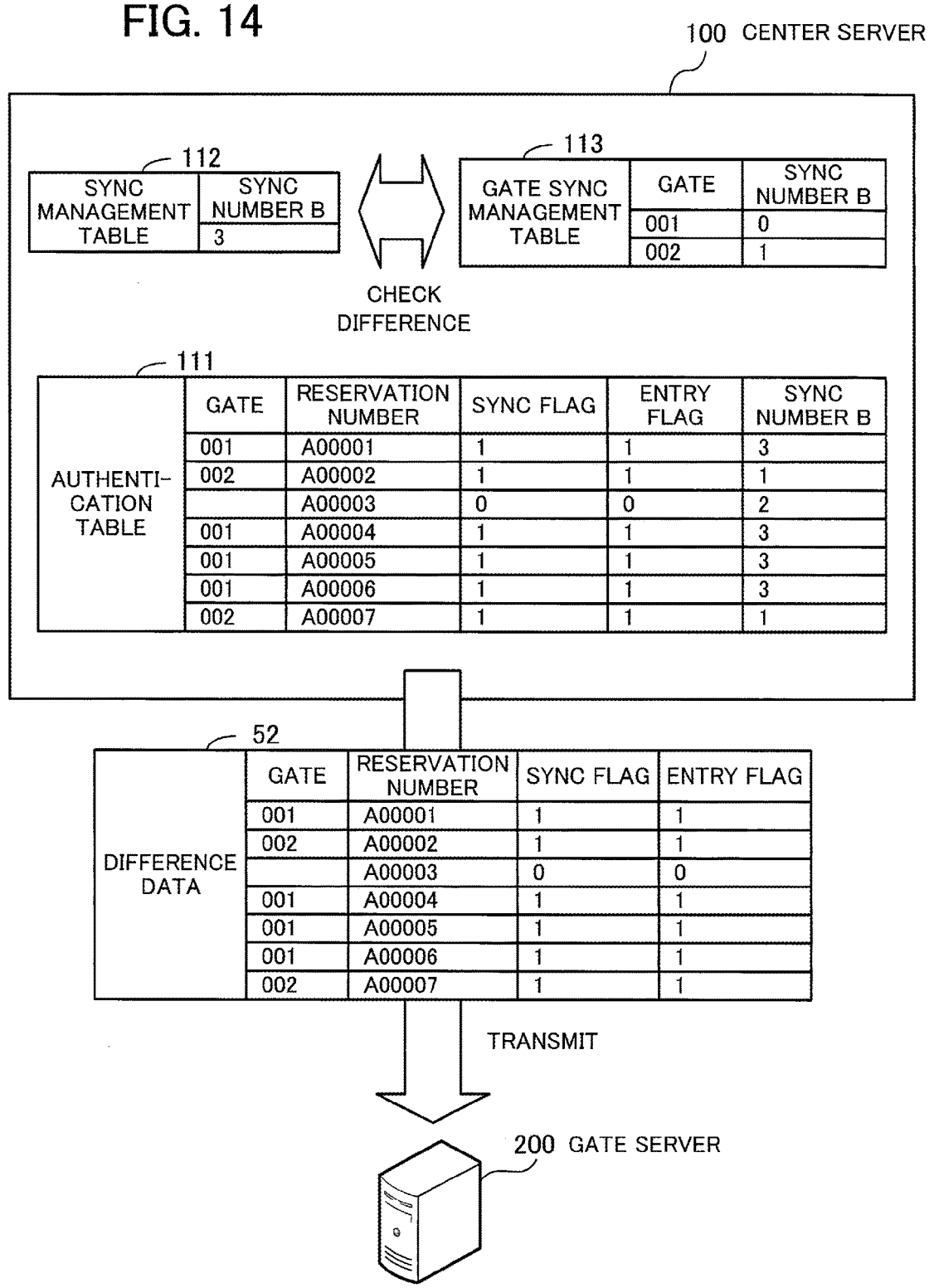
FIG. 14 is a third diagram illustrating the example of the synchronization process between the center server and the gate server.

FIG. 14 is a third diagram illustrating the example of the synchronization process between the center server and the gate server. After updating the information in the storing unit 110 based on the synchronization data 51, the center server 100 checks whether there is a difference between the value of the synchronization number B in the synchronization management table 112 and that of the gate server 200 (with the gate number "001") in the gate synchronization management table 113. According to the example of FIG. 14, the synchronization number B of the gate server 200 is set to "0" while the synchronization number B in the synchronization management table 112 is set to "3". It can therefore be seen that the content of the records with the synchronization number B set to "1", "2", or "3" in the authentication table 111 have not been reflected in the gate server 200. Hence, the records with the synchronization number B set to "1", "2", or "3" are extracted from the authentication table 111, to create difference data 52 including the extracted records. Note that, in creating the difference data 52, the value of the synchronization number B is deleted from each of the records because the gate server 200 does not use the information.

Figure 15:
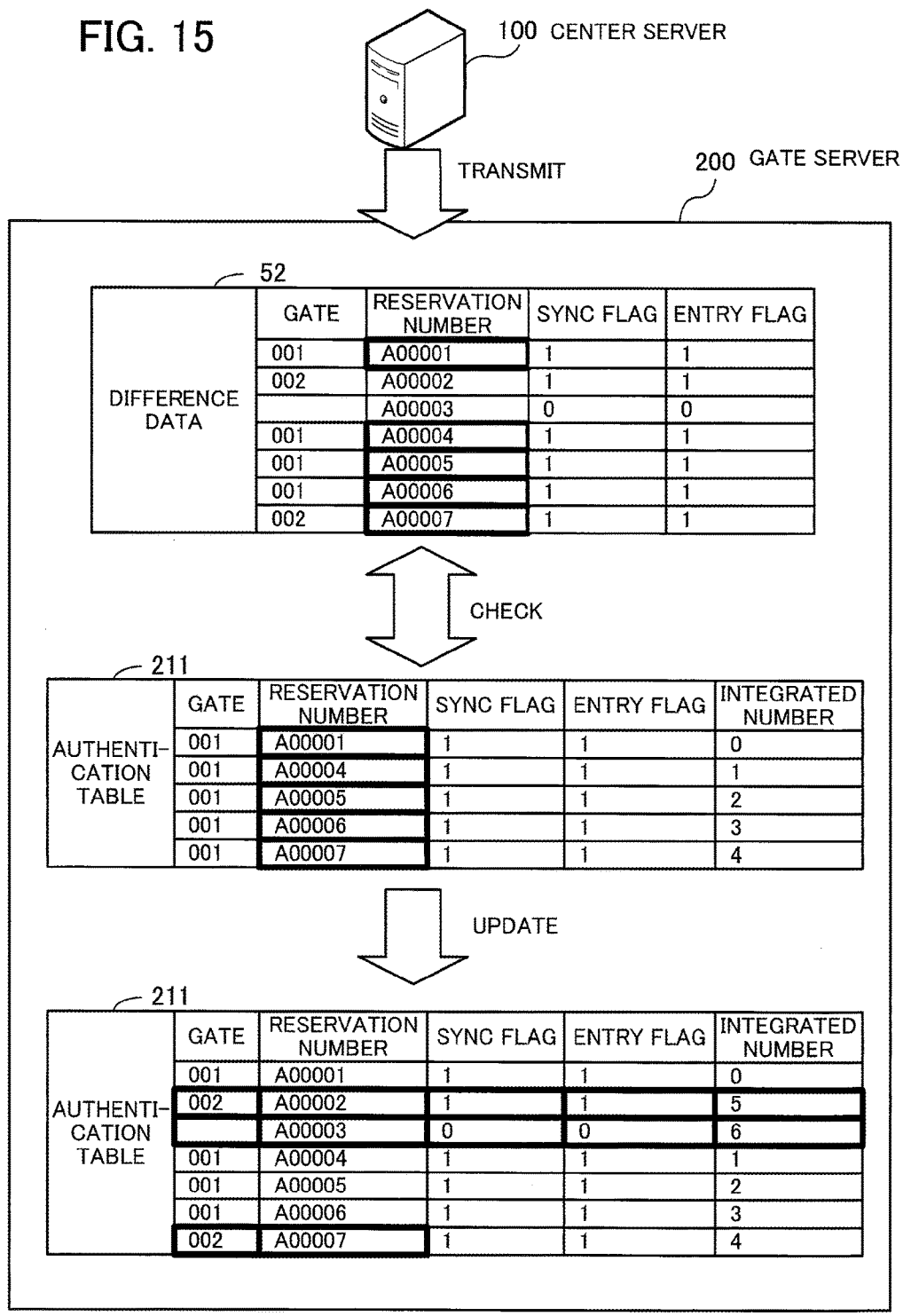
FIG. 15 is a fourth diagram illustrating the example of the synchronization process between the center server and the gate server.

FIG. 15 is a fourth diagram illustrating the example of the synchronization process between the center server and the gate server. Upon receiving the difference data 52, the gate server 200 checks whether, for each of the records in the difference data 52, a record of the same reservation number is found in the authentication table 211. Then, the authentication table 211 is updated based on the difference data 52. According to the example of FIG. 15, as for the records with the reservation numbers "A00002" and "A00003" in the difference data 52, corresponding records are not present in the authentication table 211. Therefore, these records are inserted into the authentication table 211. After completing the update of the authentication table 211 in the gate server 200, a synchronization process completion response is transmitted from the gate server 200 to the center server 100.

Figure 16:
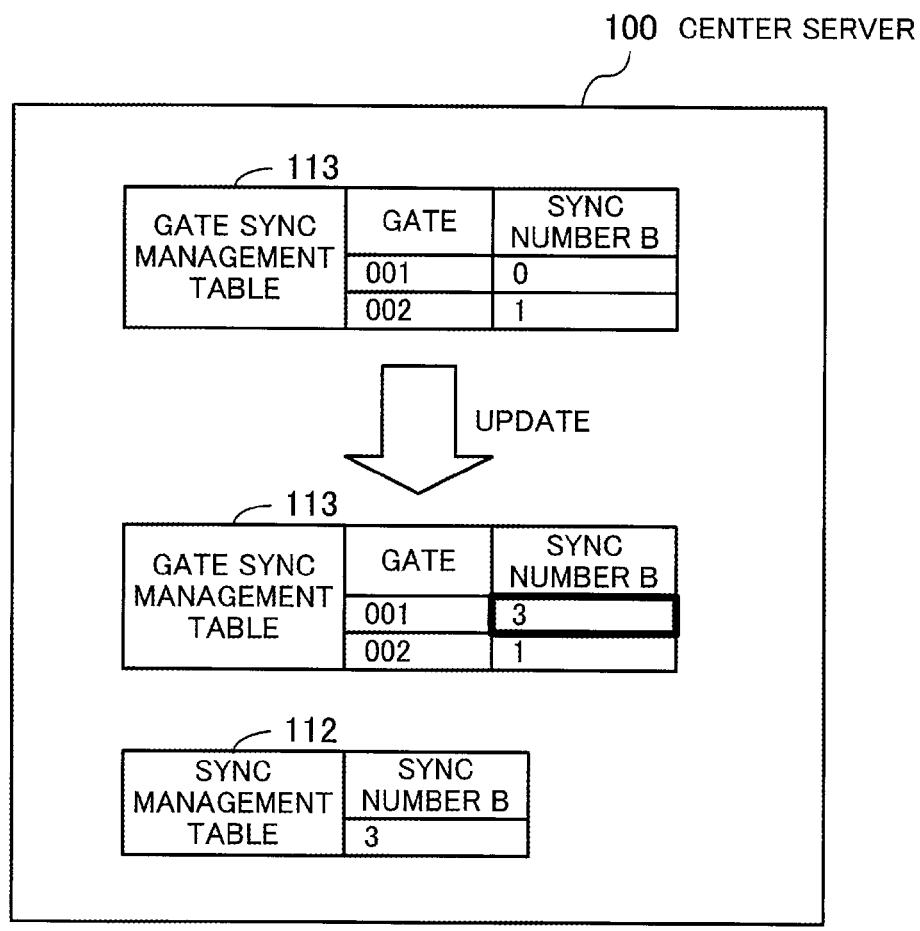
FIG. 16 is a fifth diagram illustrating the example of the synchronization process between the center server and the gate server.

FIG. 16 is a fifth diagram illustrating the example of the synchronization process between the center server and the gate server. Upon receiving the synchronization process completion response, the center server 100 updates, within the gate synchronization management table 113, the synchronization number B corresponding to the gate server 200 to "3" the same as that of the synchronization number B in the synchronization management table 112.

Executing the synchronization process between the center server 100 and the gate server 200 in the above-described manner keeps the content of their authentication tables 111 and 211 up to date, and ensures consistency of the information on whether the attendee of each reservation has entered the event site 30.

Figure 17:
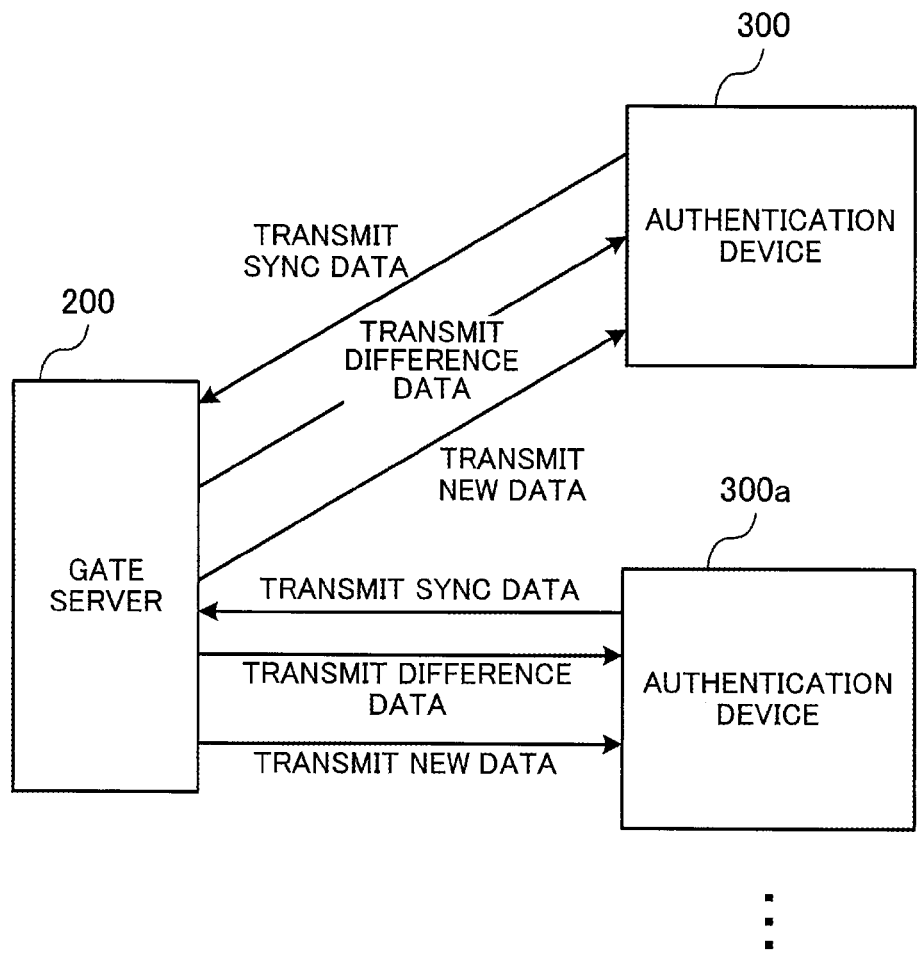
FIG. 17 illustrates an outline of synchronization processes between the gate server and authentication devices.

Synchronization processes between the gate server 200 and the authentication devices 300, 300a, and so on are described next in detail. FIG. 17 illustrates an outline of synchronization processes between the gate server and authentication devices. Synchronization data is transmitted from each of the authentication devices 300, 300a, and so on to the gate server 200. The synchronization data includes, amongst records registered in the authentication table of each of the authentication devices 300, 300a, and so on, records of reservations made by attendees who have entered the event site 30 after the execution of the previous synchronization process.

Difference data and new data are transmitted from the gate server 200 to each of the authentication devices 300, 300a, and so on. The difference data includes, amongst records registered in the authentication table 211 of the gate server 200, records updated after the previous synchronization process carried out between the gate server 200 and an authentication device to which the difference data is to be transmitted. The new data includes, amongst records registered in the authentication table 211 of the gate server 200, records newly added after the previous synchronization process between the gate server 200 and an authentication device to which the new data is to be transmitted. By exchanging such synchronization data, difference data, and new data, information in the authentication tables is synchronized between the gate server 200 and each of the authentication devices 300, 300a, and so on.

Figure 18:
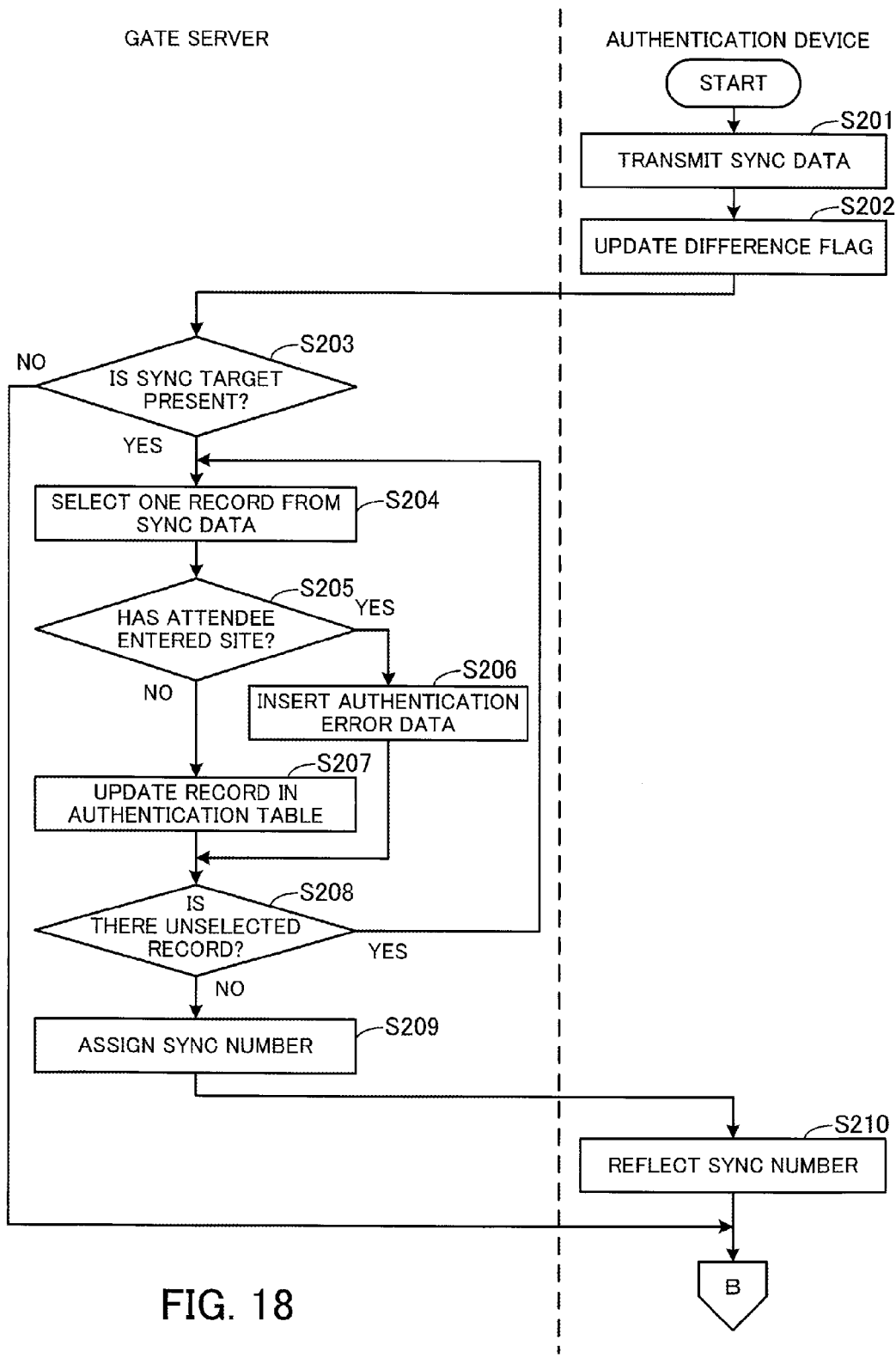
FIG. 18 is a first flowchart illustrating a procedure of a synchronization process between the gate server and the authentication device.

FIG. 18 is a first flowchart illustrating a procedure of a synchronization process between the gate server and an authentication device. The following describes a synchronization process carried out between the gate server 200 and the authentication device 300; however, a similar process takes place between the gate server 200 and each of the rest of the authentication devices 300a and so on. In FIG. 18, a procedure executed by the gate server 200 is illustrated on the left-hand side, and a procedure executed by the authentication device 300 is illustrated on the right-hand side.

[Step S201] At a predetermined time to start a synchronization process, the synchronization processing unit 320 of the authentication device 300 transmits synchronization data to the gate server 200. For example, the authentication device 300 starts a synchronization process with a predetermined period of time (for example, at intervals of 30 seconds). In addition, the authentication device 300 may perform a synchronization process with each authentication of an attendee.

Specifically, when it comes to the time to start a synchronization process, the synchronization processing unit 320 extracts, from the authentication table 311, one or more records each indicating that an attendee having made the reservation has entered the event site 30 but having yet to undergo synchronization, and then transmits synchronization data including the extracted records to the gate server 200. For example, the synchronization processing unit 320 extracts each record with both the entry flag and difference flag set to "1" from the authentication table 311, and generates synchronization data including the extracted records. Subsequently, the synchronization processing unit 320 transmits the generated synchronization data to the gate server 200.

[Step S202] After transmitting the synchronization data, the synchronization processing unit 320 updates, within the authentication table 311, the difference flag of each of the records included in the synchronization data to "2".

[Step S203] Upon receiving the synchronization data, the authentication-device synchronization processing unit 230 of the gate server 200 determines whether a synchronization target record is present in the authentication table 211. For example, the authentication-device synchronization processing unit 230 searches the authentication table 211 for a record using the reservation number of each record included in the synchronization data. If at least one record is found in the authentication table 211, the authentication-device synchronization processing unit 230 determines that a synchronization target record is present. When a synchronization target record is present, the process moves to step S204. When no synchronization target record is present, the authentication-device synchronization processing unit 230 informs the authentication device 300 of the value of the synchronization number A in the synchronization management table 212, and subsequently, the process moves to step S211 (refer to FIG. 19).

[Step S204] The authentication-device synchronization processing unit 230 selects one untreated record from the synchronization data.

[Step S205] The authentication-device synchronization processing unit 230 determines whether a reservation represented by the selected record indicates, in the authentication table 211, that the attendee has already entered the event site 30. For example, the authentication-device synchronization processing unit 230 searches the authentication table 211 for a record using the reservation number of the selected record. Then, if the entry flag of the corresponding record is set to "0", the authentication-device synchronization processing unit 230 determines that the attendee has yet to enter the event site 30. On the other hand, if the entry flag is set to "1" the authentication-device synchronization processing unit 230 determines that the attendee has already entered the event site 30. When determining that the attendee has already entered the event site 30, the process moves to step S206. When determining that the attendee has yet to enter the event site 30, the process moves to step S207.

[Step S206] When the attendee has already entered the event site 30, the authentication-device synchronization processing unit 230 inserts, into the authentication error table 213, authentication error data for the reservation represented by the selected record. For example, the authentication-device synchronization processing unit 230 extracts the terminal number and reservation number from the selected record and adds error content indicating a "duplicate entry" to the extracted information, and then registers the information in the authentication error table 213. Subsequently, the process moves to step S208.

[Step S207] The authentication-device synchronization processing unit 230 updates, within the authentication table 211, a record corresponding to the selected record. For example, the authentication-device synchronization processing unit 230 extracts the terminal number from the selected record. Then, the authentication-device synchronization processing unit 230 sets the extracted terminal number, within the terminal number column of the authentication table 211, in a field of the corresponding record. The authentication-device synchronization processing unit 230 also changes, within the authentication table 211, the values of the difference flag and the entry flag of the corresponding record to "2" and "1", respectively.

[Step S208] The authentication-device synchronization processing unit 230 determines whether, in the synchronization data, one or more records remain unselected. If one or more records remain unselected, the process moves to step S204. If no record in the synchronization data remains unselected, the process moves to step S209.

[Step S209] The authentication-device synchronization processing unit 230 assigns a number to the synchronization number of each of the updated records. For example, the authentication-device synchronization processing unit 230 adds 1 to the value of the synchronization number A in the synchronization management table 212. Then, the authentication-device synchronization processing unit 230 sets, in the authentication table 211, the value of the synchronization number A obtained after the addition as the value of the synchronization number A of each record updated in step S207. Subsequently, the authentication-device synchronization processing unit 230 informs the authentication device 300 of the reservation numbers of the records for which the synchronization number A has been set and the value of the synchronization number A obtained after the addition.

[Step S210] The synchronization processing unit 320 of the authentication device 300 reflects the value of the synchronization number A sent from the gate server 200 in one or more synchronization target records in the authentication table 311. For example, the synchronization processing unit 320 sets, in the authentication table 311, the value of the synchronization number A sent from the gate server 200 as the synchronization number A of each of records corresponding to the sent reservation numbers. Subsequently, the process moves to step S211 (refer to FIG. 19).

Figure 19:
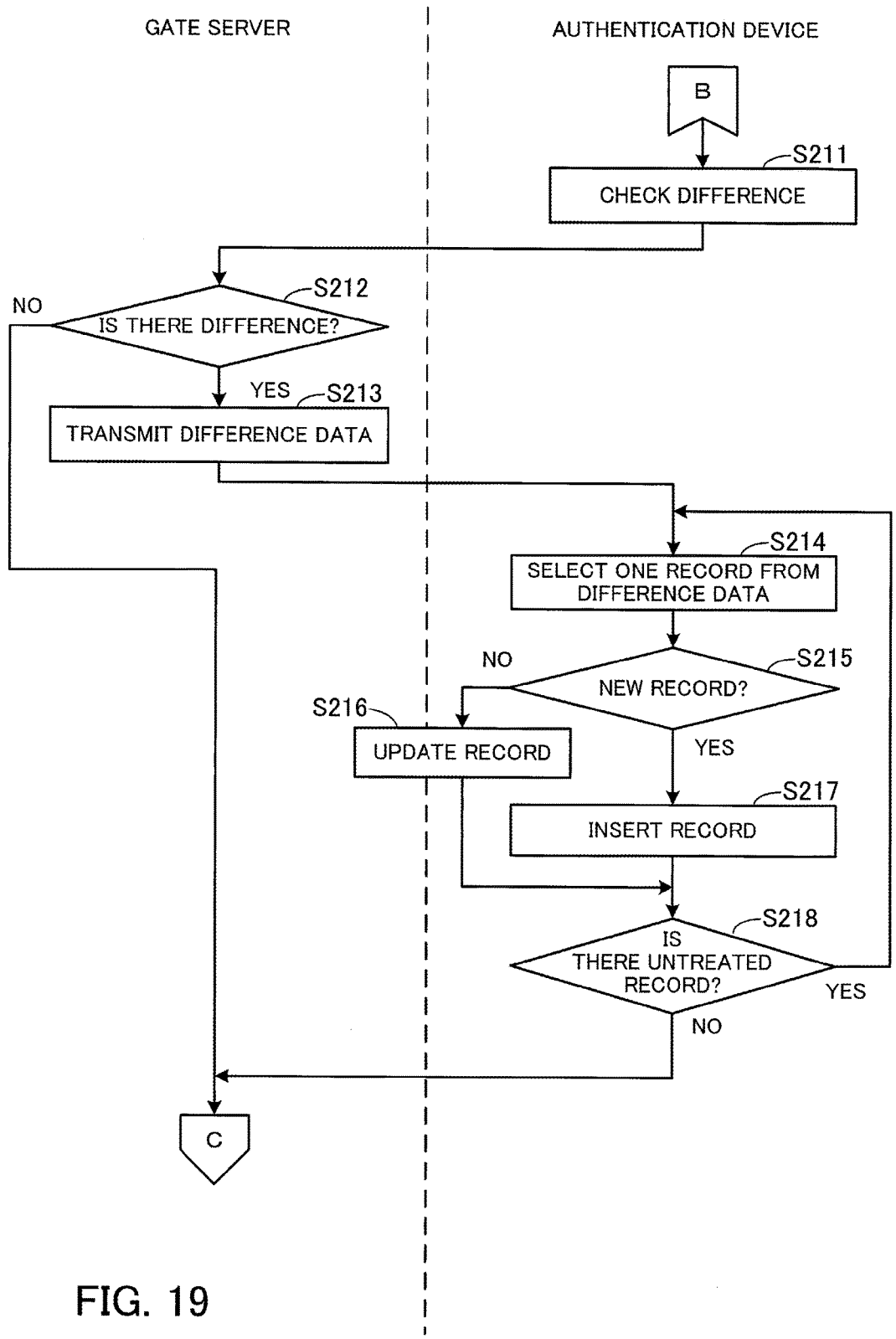
FIG. 19 is a second flowchart illustrating the procedure of the synchronization process between the gate server and the authentication device.

FIG. 19 is a second flowchart illustrating the procedure of the synchronization process between the gate server and the authentication device.

[Step S211] The synchronization processing unit 320 of the authentication device 300 performs a difference check based on the value of the synchronization number A sent from the gate server 200. For example, the synchronization processing unit 320 compares the value of the synchronization number A sent from the gate server 200 against that in the synchronization management table 312, to thereby determine whether there is a difference between them. The synchronization processing unit 320 provides the gate server 200 with the result of the difference check.

[Step S212] If the result of the difference check indicates that there is a difference, the authentication-device synchronization processing unit 230 of the gate server 200 moves to step S213. If not, the authentication-device synchronization processing unit 230 moves to step S221 (refer to FIG. 20).

[Step S213] When there is a difference in the values of the synchronization number A, the authentication-device synchronization processing unit 230 transmits difference data to the authentication device 300. For example, the authentication-device synchronization processing unit 230 extracts, from the authentication table 211, one or more records whose synchronization number A is larger than the value of the synchronization number A in the synchronization management table 312 but smaller than the value of the synchronization number A in the synchronization management table 212. Then, the authentication-device synchronization processing unit 230 generates difference data including the extracted records and transmits the difference data to the authentication device 300.

[Step S214] The synchronization processing unit 320 of the authentication device 300 selects one untreated record from the received difference data.

[Step S215] The synchronization processing unit 320 determines whether the selected record is a new record. For example, the synchronization processing unit 320 searches the authentication table 311 for a record corresponding to the reservation number of the selected record. If there is no record corresponding to the reservation number, the selected record is a new record. If the selected record is a new record, the process moves to step S217. If not, the process moves to step S216.

[Step S216] The synchronization processing unit 320 updates the corresponding record in the authentication table 311 in accordance with the selected record. Subsequently, the process moves to step S218.

[Step S217] The synchronization processing unit 320 inserts the selected record into the authentication table 311 as a new record.

[Step S218] The synchronization processing unit 320 determines whether, in the difference data, one or more records remain untreated. If one or more records remain untreated, the process moves to step S214. If no record in the difference data remains untreated, the synchronization processing unit 320 transmits a synchronization process completion response to the gate server 200, and then the process moves to step S221 (refer to FIG. 20). In this regard, the synchronization processing unit 320 transmits, in addition to the synchronization process completion response, the value of the integrated number in the synchronization management table 312 to the gate server 200 so as to allow the gate server 200 to check new reservations.

Figure 20:
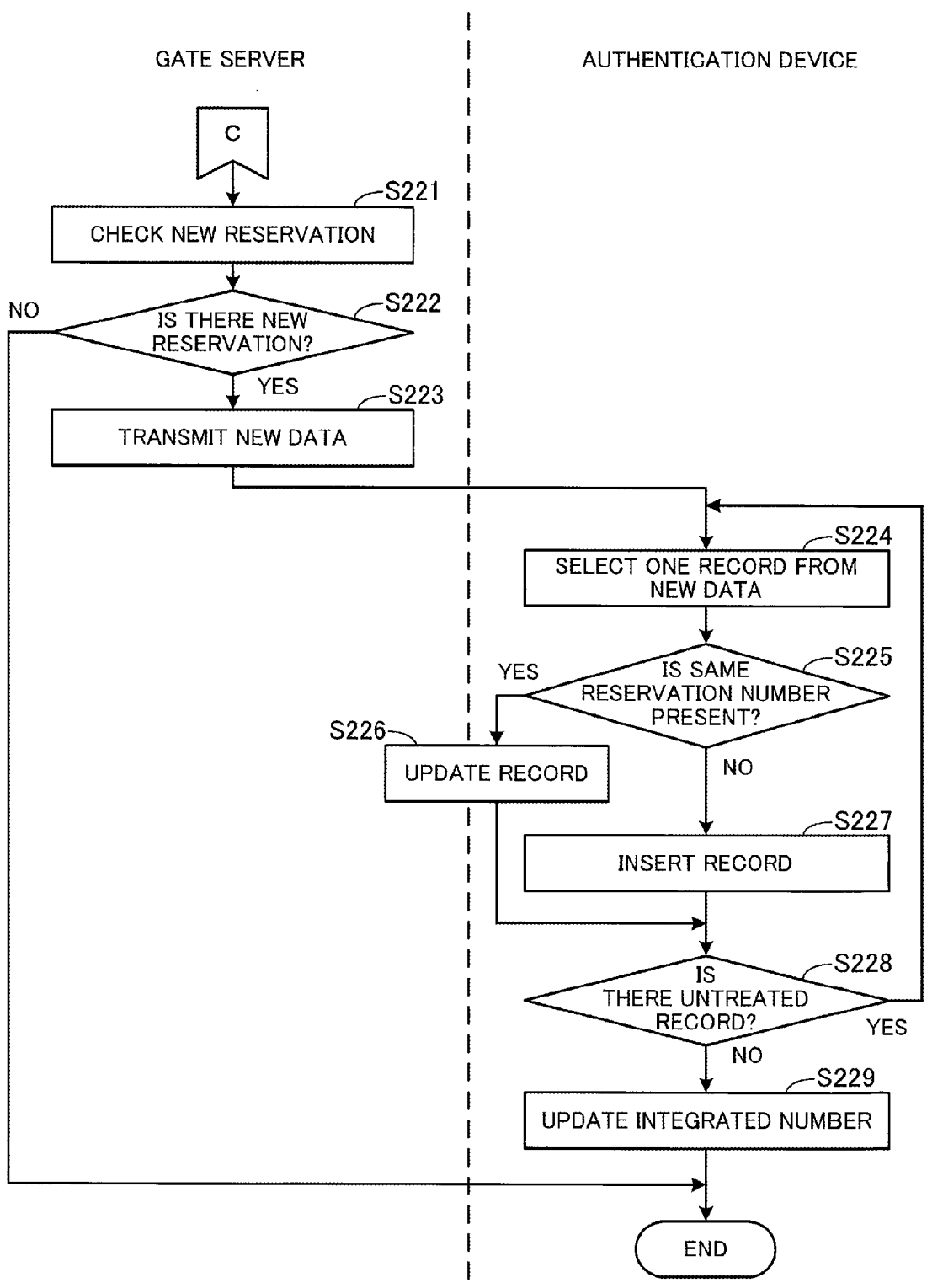
FIG. 20 is a third flowchart illustrating the procedure of the synchronization process between the gate server and the authentication device.

FIG. 20 is a third flowchart illustrating the procedure of the synchronization process between the gate server and the authentication device.

[Step S221] The authentication-device synchronization processing unit 230 of the gate server 200 checks whether there is one or more new reservations. For example, if one or more records each assigned an integrated number larger than the integrated number acquired from the authentication device 300 are present in the authentication table 211, the authentication-device synchronization processing unit 230 determines that there are new reservations.

[Step S222] If there is one or more new reservations, the authentication-device synchronization processing unit 230 proceeds to step S223. If there is no new reservation, the authentication-device synchronization processing unit 230 ends the synchronization process.

[Step S223] The authentication-device synchronization processing unit 230 transmits, to the authentication device 300, new data including records representing the new reservations. For example, the authentication-device synchronization processing unit 230 extracts, from the authentication table 211, records each assigned an integrated number larger than the integrated number acquired from the authentication device 300. Then, the authentication-device synchronization processing unit 230 generates new data including the extracted records and transmits the generated new data to the authentication device 300.

[Step S224] The synchronization processing unit 320 of the authentication device 300 selects one untreated record from the received new data.

[Step S225] The synchronization processing unit 320 determines whether a record having the same reservation number as that of the selected record is present in the authentication table 311. For example, when a change is made to the reservation content, a new record with the same reservation number is likely to be registered. If there is a record with the same reservation number, the process moves to step S226. If not, the process moves to step S227.

[Step S226] The synchronization processing unit 320 updates the record in the authentication table 311 in accordance with the selected record. Subsequently, the process proceeds to step S228.

[Step S227] The synchronization processing unit 320 inserts the selected record into the authentication table 311.

[Step S228] The synchronization processing unit 320 determines whether one or more records remain untreated. If one or more records remain untreated, the process moves to step S224. If no record remains untreated, the process moves to step S229.

[Step S229] The synchronization processing unit 320 updates the integrated number of the synchronization management table 312. For example, the synchronization processing unit 320 changes the value of the integrated number in the synchronization management table 312 to the largest value of the integrated numbers set in the authentication table 311.

In the above-described manner, the synchronization process is carried out between the gate server 200 and the authentication device 300, and the gate server 200 and the authentication device 300 are able to update the information on whether each attendee has entered the event site 30 to the latest one in cooperation with each other.

Figure 21:
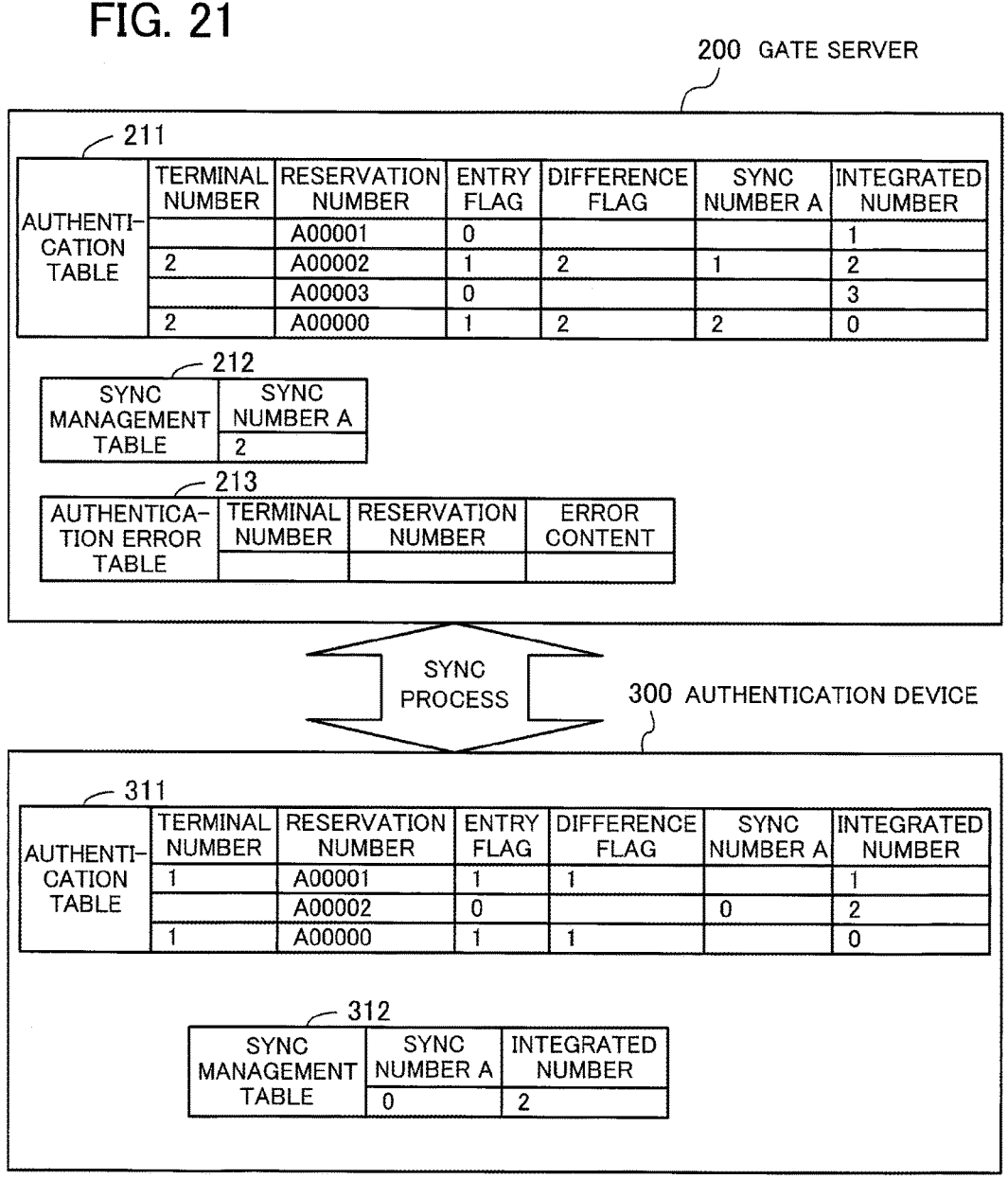
FIG. 21 illustrates an example of information stored at a start of the synchronization process between the gate server and the authentication device.

Next described is an example of the synchronization process between the gate server 200 and the authentication device 300. FIG. 21 illustrates an example of information stored at the start of a synchronization process between the gate server and the authentication device. According to the example of FIG. 21, records of four reservations are registered in the authentication table 211 of the gate server 200 while records of three reservations are registered in the authentication table 311 of the authentication device 300. Among them, the record with the reservation number "A00001" represents a reservation for which the entry of the attendee to the event site 30 has yet to be reflected in the gate server 200, and the reservation therefore becomes a target of the synchronization process between the gate server 200 and the authentication device 300. The record with the reservation number "A00002" represents a reservation for which the entry of the attendee has been reflected in the gate server 200 after the gate server 200 performed synchronization with a different authentication device (with the terminal number "2"). The content of the record is going to be reflected in the authentication device 300 (with the terminal number "1") by transmission of difference data. The record with the reservation number "A00003" represents a new reservation. The content of the record is also going to be reflected in the authentication device 300 by transmission of the difference data. The record with the reservation number "A00000" represents a reservation for which the entry of the attendee has been reflected in the gate server 200 after the gate server 200 performed synchronization with the different authentication device (with the terminal number "2"). The content of the record is going to be transmitted from the authentication device 300 to the gate server 200 as synchronization data in the synchronization process; however, the corresponding record in the gate server 200 indicates that the attendee has already entered the event site 30, and is therefore going to be recorded as a "duplicate entry error".

Assume that, at the start of the synchronization process, the gate server 200 has completed synchronization of data having a synchronization number of "1" with the different authentication device (with the terminal number "2"), and has never performed synchronization with the authentication device 300. Next described is a specific procedure of the synchronization process between the gate server 200 and the authentication device 300 having the above-described information, with reference to FIGS. 22 to 26. Note that FIGS. 22 to 26 omit information not used in the synchronization process with the authentication device 300 from the authentication table 211 of the gate server 200.

Figure 22:
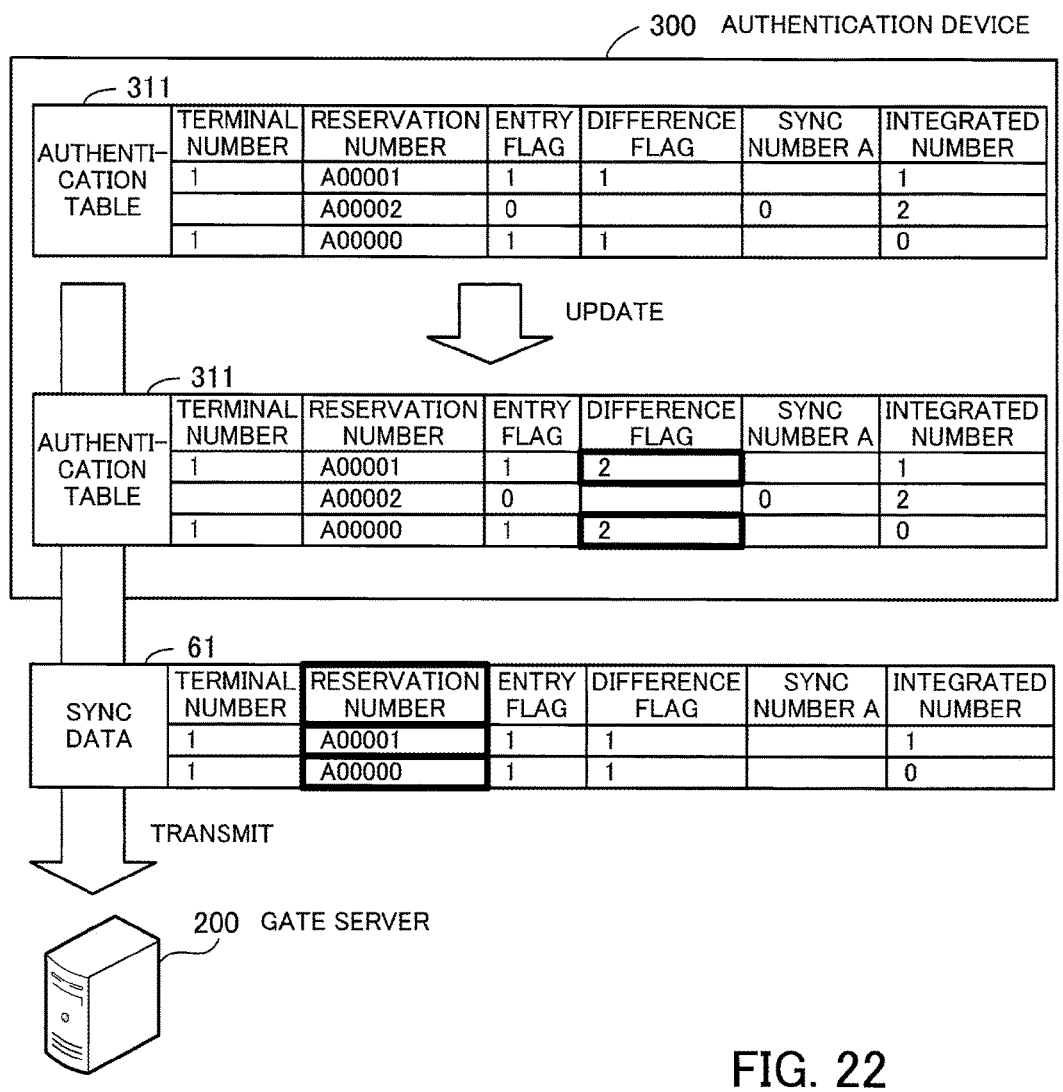
FIG. 22 is a first diagram illustrating an example of the synchronization process between the gate server and the authentication device.

FIG. 22 is a first diagram illustrating an example of a synchronization process between the gate server and the authentication device. When it comes to the time to start a synchronization process, one or more records whose entry flag and difference flag are both set to "1" are extracted from the authentication table 311 of the authentication device 300 as synchronization targets. Then, synchronization data 61 including the extracted records is generated and transmitted to the gate server 200. Subsequently, the difference flag of each of the synchronization target records in the authentication table 311 is updated to "2".

Figure 23:
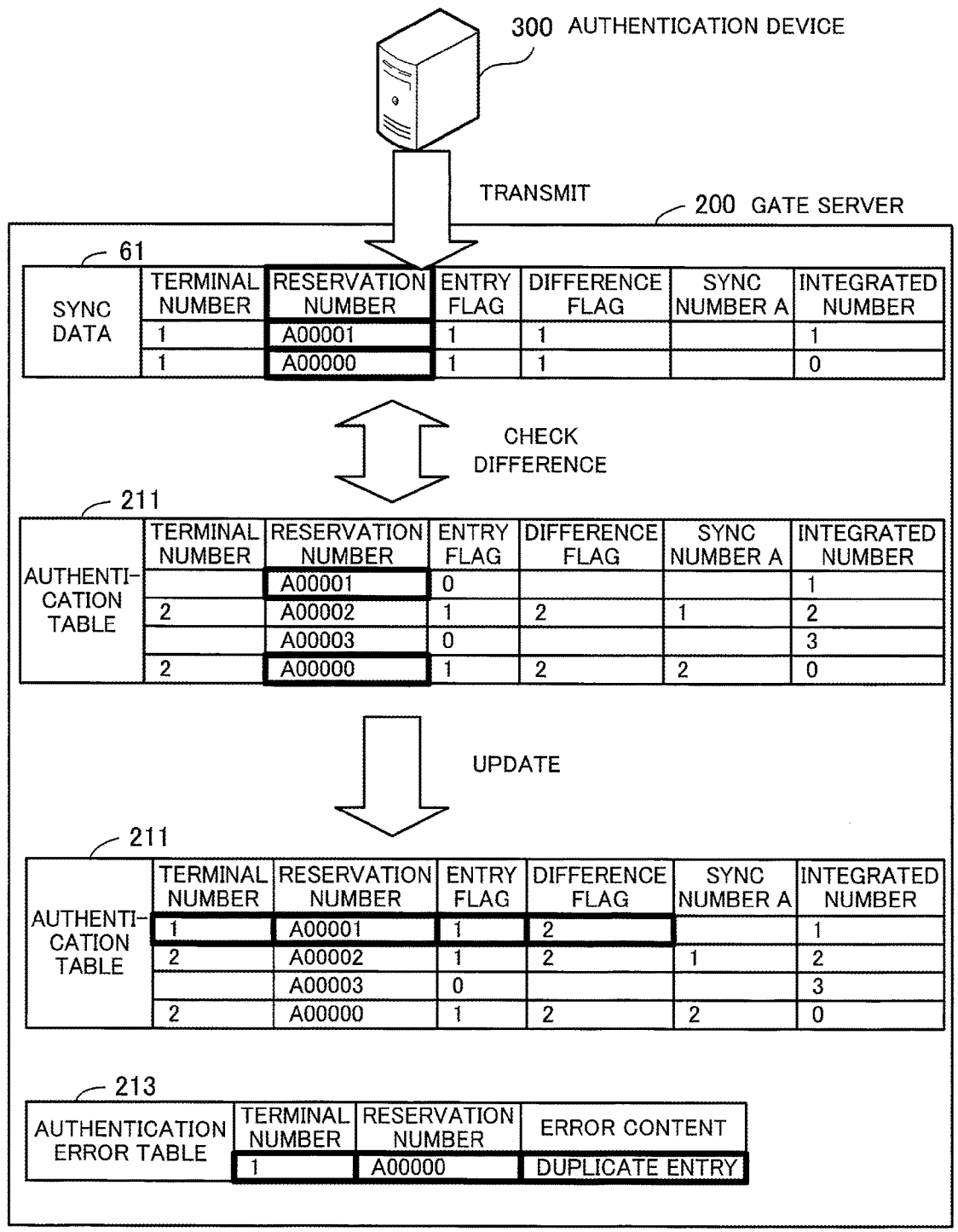
FIG. 23 is a second diagram illustrating the example of the synchronization process between the gate server and the authentication device.

FIG. 23 is a second diagram illustrating the example of the synchronization process between the gate server and the authentication device. The gate server 200 checks a difference between the received synchronization data 61 and the authentication table 211. For example, the gate server 200 checks whether a record corresponding to each of the records in the synchronization data 61 is included in the authentication table 211, and whether the entry flag of the corresponding record is set to "0".

If, within the authentication table 211, the entry flag of a record corresponding to a record included in the synchronization data 61 is set to "0", the entry flag is updated to "1" and the difference flag is set to "2". If, within the authentication table 211, the entry flag of a record corresponding to a record included in the synchronization data 61 is set to "1", error information is registered in the authentication error table 213. According to the example of FIG. 23, error information is registered with the terminal number "1", the reservation number "A00000", and the error content "duplicate entry".

Figure 24:
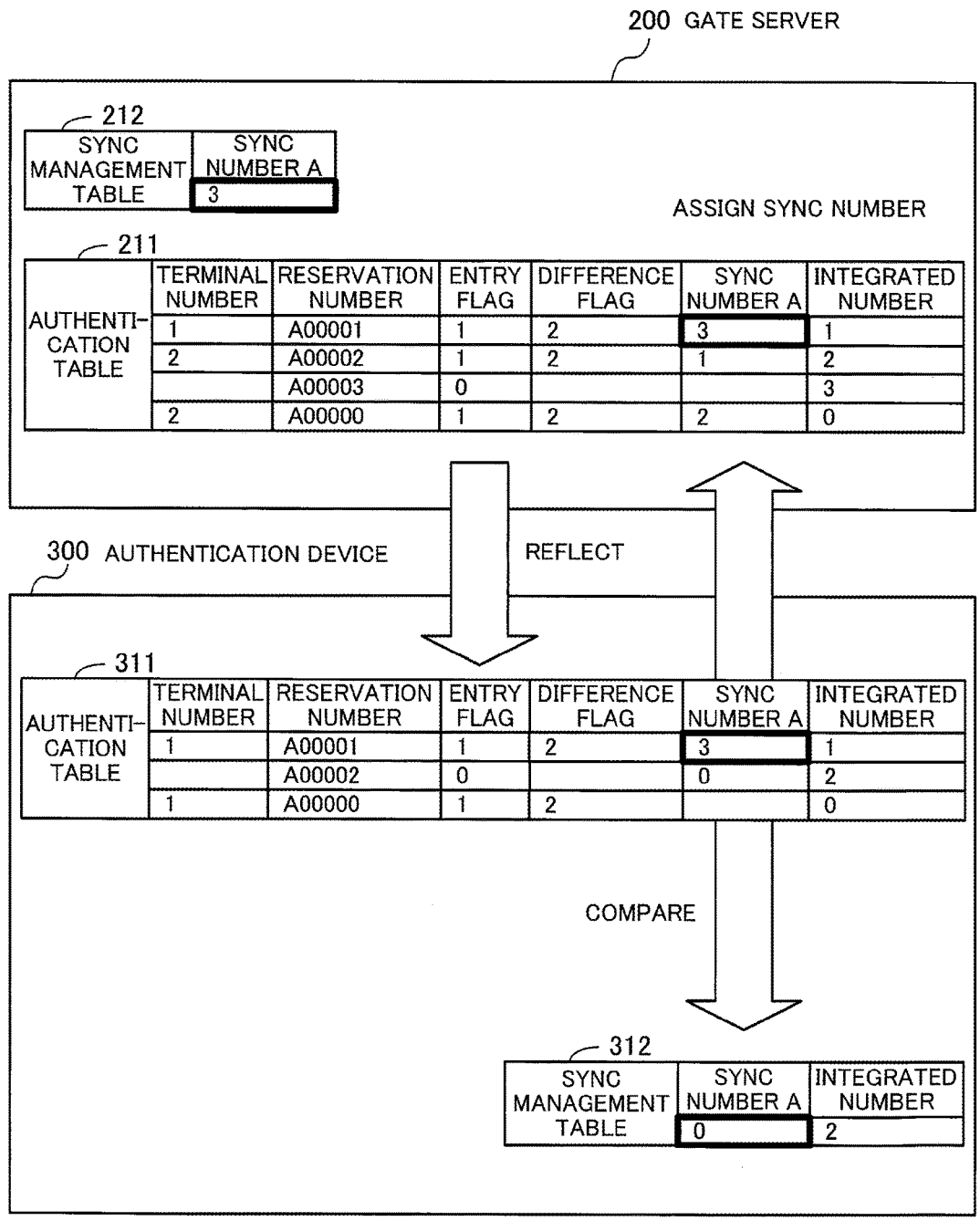
FIG. 24 is a third diagram illustrating the example of the synchronization process between the gate server and the authentication device.

FIG. 24 is a third diagram illustrating the example of the synchronization process between the gate server and the authentication device. After the update of the authentication table 211 of the gate server 200, a synchronization number is assigned to the updated record. According to the example of FIG. 24, the synchronization number A of the synchronization management table 212 is increased from "2" to "3", and the updated value "3" is set as the synchronization number A of the record updated according to the synchronization data 61. The assigned value "3" of the synchronization number A is transmitted to the authentication device 300, and set as the value of the synchronization number A of the corresponding record in the authentication table 311 of the authentication device 300.

Then, the value "0" of the synchronization number A in the synchronization management table 312 of the authentication device 300 is compared with the assigned value "3" of the synchronization number A. In this example, there is a difference in the values of the synchronization number A. This comparison may be performed by either one of the gate server 200 and the authentication device 300. In the case where the authentication device 300 performs the comparison, the comparison result is transmitted from the authentication device 300 to the gate server 200. In the case where the gate server 200 performs the comparison, the value of the synchronization number A in the synchronization management table 312 is transmitted from the authentication device 300 to the gate server 200. Then, in the gate server 200, the received value of the synchronization number A is compared with the value of the synchronization number A in the synchronization management table 212.

Figure 25:
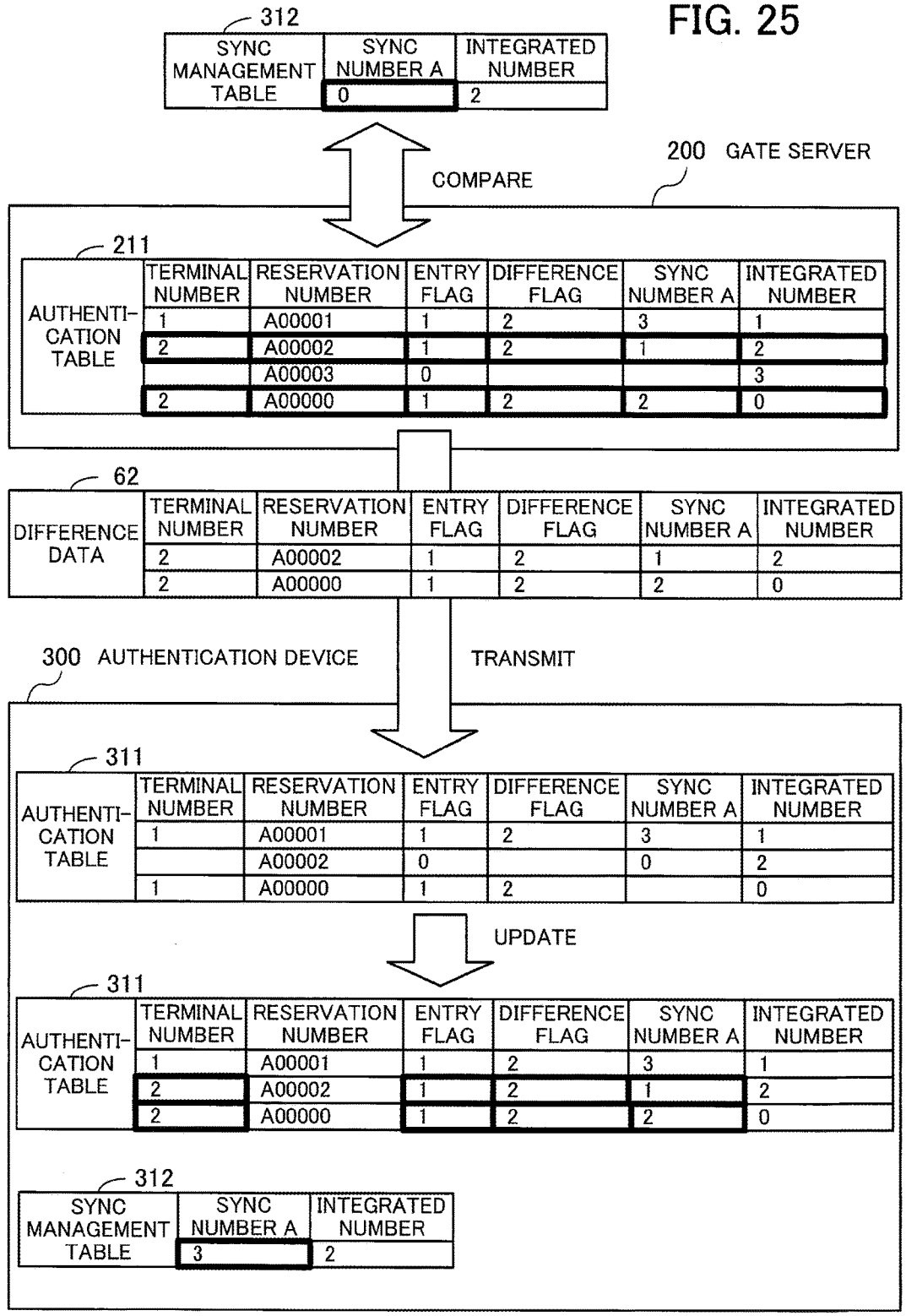
FIG. 25 is a fourth diagram illustrating the example of the synchronization process between the gate server and the authentication device.

FIG. 25 is a fourth diagram illustrating the example of the synchronization process between the gate server and the authentication device. Based on the comparison result of the values of the synchronization number A, the gate server 200 extracts one or more records synchronized after the previous synchronization process of the authentication device 300, to thereby generate difference data 62. According to the example of FIG. 25, records each with the synchronization number A being "1" or "2" are extracted and then included in the difference data 62. Note that, amongst the records each with the synchronization number A being larger than the synchronization number A in the synchronization management table 312 of the authentication device 300, a record with the synchronization number A being "3" the same as that of the synchronization number A in the synchronization management table 212 has been synchronized based on the synchronization data 61. Therefore, the record with the synchronization number A being "3" is not included in the difference data 62.

Upon receiving the difference data 62, the authentication device 300 checks whether a record corresponding to each record included in the difference data 62 is found in the authentication table 311. Then, the content of one or more corresponding records is updated in accordance with the records included in the difference data 62. According to the example of FIG. 25, the content of the records with the reservation numbers "A00002" and "A00000" is updated to have the same content as the corresponding records in the difference data 62. In addition, in the authentication device 300, the largest value selected from the values of the synchronization number A of the individual records in the authentication table 311 is set as the value of the synchronization number A in the synchronization management table 312.

Figure 26:
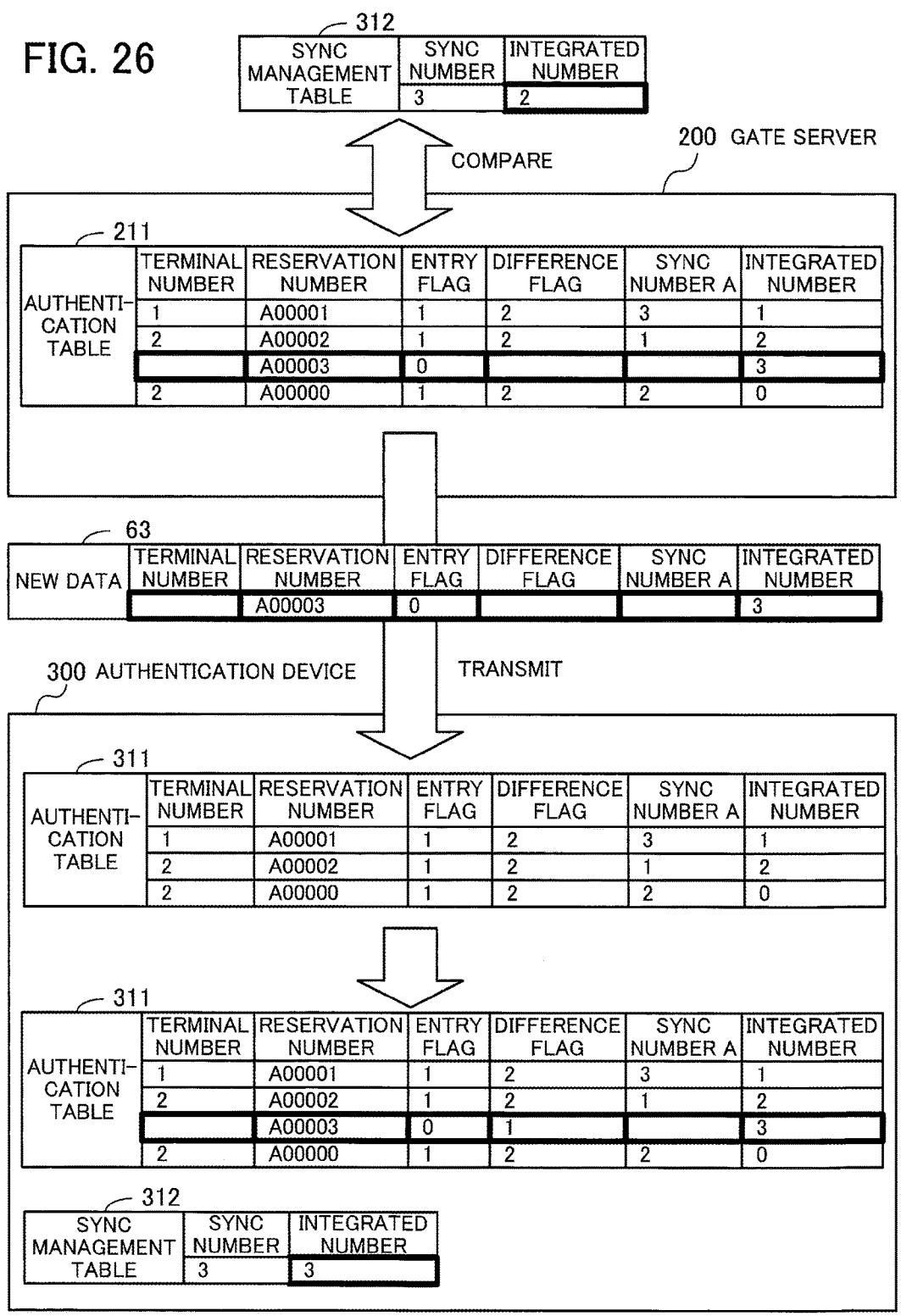
FIG. 26 is a fifth diagram illustrating the example of the synchronization process between the gate server and the authentication device.

FIG. 26 is a fifth diagram illustrating the example of the synchronization process between the gate server and the authentication device. The gate server 200 compares the largest value amongst the integrated numbers of the individual records in the authentication table 211 against the integrated number in the synchronization management table 312, and generates new data 63 if there is a difference. The new data 63 includes, amongst the records included in the authentication table 211, one or more records each with the integrated number being larger than the integrated number in the synchronization management table 312 of the authentication device 300.

Upon receiving the new data 63, the authentication device 300 checks whether a record corresponding to each record included in the new data 63 is found in the authentication table 311. If no record is found, the records included in the new data 63 are inserted into the authentication table 311. After the new records are reflected, the integrated number in the synchronization management table 312 is updated to the largest value amongst the integrated numbers of the individual records in the authentication table 311.

In the above-described manner, information on whether each attendee has entered the event site 30 is shared across the center server 100, the gate servers 200, 200a, and so on, and the authentication devices 300, 300a, 300b, 300c, and so on. As a result, it is possible to prevent the same reservation number from being used multiple times on different authentication devices to allow attendees to enter the event site 30. That is, when each of the authentication devices 300, 300a, 300b, 300c, and so on reads a reservation number of an attendee from its mobile terminal or the like, the authentication device is able to determine a duplicate entry if the entry flag corresponding to the reservation number is set to "1" in its own authentication table. In addition, each of the authentication devices 300, 300a, 300b, 300c, and so on is able to make the duplicate entry determination on its own. Therefore, the authentication devices 300, 300a, 300b, 300c, and so on are able to detect duplicate entries even when communicating with the gate servers 200, 200a, and so on with unstable links.

In addition, even if individual authentication devices have already allowed attendees to enter the event site 30 because a duplicate entry took place before the synchronization of the content of the authentication tables, it is possible to detect the duplicate entry by the subsequent synchronization process.

Note that the synchronization process between the center server 100 and each of the gate server 200, 200*a*, and so on according to the second embodiment may be applied to the synchronization processes between each of the gate server 200, 200*a* and so on and each of its corresponding authentication devices 300, 300*a*, 300*b*, 300*c*, and so on. In addition, the synchronization process between each of the gate servers 200, 200*a*, and so on and each of its corresponding authentication devices 300, 300*a*, 300*b*, 300*c*, and so on may be applied to the synchronization process between the center server 100 and each of the gate servers 200 200*a*, and so on.

While, as described above, the embodiments have been exemplified, the configurations of individual portions illustrated in the embodiments may be replaced with others having the same functions. In addition, another constituent element or process may be added thereto. Furthermore, two or more compositions (features) of the embodiments may be combined together.

According to one aspect, it is possible to efficiently carry out synchronization processes among a plurality of authentication apparatuses to update information on whether each authentication process has been executed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An authentication system comprising:
a plurality of authentication apparatuses; and
a management apparatus, wherein
each of the plurality of authentication apparatuses includes:
   a first memory configured to store identification information entries of individual authentication targets, each in association with an execution information entry indicating whether authentication of the corresponding authentication target has been executed,
   a first processor configured to receive a credential including an identification information entry of an authentication target, and execute an authentication process of the authentication target, and
   a first communication interface configured to transmit and receive information to and from the management apparatus,
the management apparatus includes:
   a second memory configured to store the identification information entries of the individual authentication targets, each in association with an execution information entry indicating whether the authentication of an authentication target corresponding to the identification information entry has been executed,
   a second processor configured to update information content stored in the second memory, and
   a second communication interface configured to transmit and receive the information to and from each of the plurality of authentication apparatuses, wherein
the second processor updates, upon receiving, from one of the plurality of authentication apparatuses, a first identification information entry which is the identification information entry of an authentication target having undergone the authentication process of the first processor and a first execution information entry indicating that the authentication process has been executed, the execution information entry corresponding to the first identification information entry in the second memory, and stores a first sequence information entry indicating a current value of a sequence number in association with the first identification information entry in the second memory, the sequence number being a number of times of updating one of execution information entries stored in the second memory, wherein
the second communication interface transmits the first sequence information entry and the first identification information entry to the authentication apparatus from which the first identification information entry and the first execution information entry have been received, and wherein
the first communication interface acquires, upon receiving the first sequence information entry from the management apparatus, a second execution information entry and a second sequence information entry stored in the second memory in association with a second identification information entry from the management apparatus, and stores, in the first memory, the second execution information entry and the second sequence information entry in association with the second identification information entry, the second identification information entry being identified based on a result obtained by comparing the first sequence information entry against a different sequence information entry received by the first communication interface prior to the reception of the first sequence information entry.

2. The authentication system according to claim 1, wherein:
amongst the identification information entries stored in the second memory, the first communication interface designates, as the second identification information entry, an identification information entry associated with a sequence information entry having a value larger than a value indicated by the different sequence information entry but smaller than a value indicated by the first sequence information entry stored in the first memory.

3. The authentication system according to claim 1, wherein:
upon receiving the first identification information entry and the first execution information entry from the first communication interface, the second processor stores error information in the second memory when the execution information entry stored in the second memory in association with the first identification information entry indicates that the authentication of the corresponding authentication target has been executed.

4. An authentication method for authenticating individual authentication targets using a plurality of authentication apparatuses that includes a first memory and a management apparatus that includes a second memory, the authentication method comprising:
receiving, by one of the plurality of authentication apparatuses, a credential including an identification information entry of an authentication target, and executing an authentication process of the authentication target;
updating, by the management apparatus, upon receiving a first identification information entry which is the identification information entry of the authentication target having undergone the authentication process and a first execution information entry indicating that the authentication process has been executed from the authentication apparatus, the execution information entry corresponding to the first identification information entry in the second memory, the second memory being configured to store identification information entries of the authentication targets, each in association with an execution information entry indicating whether the authentication of an authentication target corresponding to the identification information entry has been executed;

storing, by the management apparatus, a first sequence information entry indicating a current value of a sequence number in association with the first identification information entry in the second memory, the sequence number being a number of times of updating one of execution information entries stored in the second memory;

transmitting, by the management apparatus, the first sequence information entry and the first identification information entry to the authentication apparatus from which the first identification information entry and the first execution information entry have been received;

acquiring, by the authentication apparatus, from the management apparatus, a second execution information entry and a second sequence information entry stored in the second memory in association with a second identification information entry upon receiving the first sequence information entry from the management apparatus; and storing, by the authentication apparatus, in the first memory, the second execution information entry and the second sequence information entry in association with the second identification information entry, the first memory being configured to store identification information entries of the authentication targets, each in association with an execution information entry indicating whether authentication of the corresponding authentication target has been executed, the second identification information entry being identified based on a result obtained by comparing the first sequence information entry against a different sequence information entry received prior to the reception of the first sequence information entry.

5. An authentication apparatus performing authentication in cooperation with a management apparatus, the authentication apparatus comprising:

a first memory configured to store identification information entries of individual authentication targets, each in association with an execution information entry indicating whether the authentication of the corresponding authentication target has been executed;

a processor configured to receive a credential including an identification information entry of an authentication target, and execute an authentication process of the authentication target; and a first communication interface configured to transmit and receive information to and from the management apparatus, wherein upon receiving a first identification information entry which is the identification information entry of an authentication target having undergone the authentication process of the processor and a first sequence information entry from the management apparatus which updates the execution information entry corresponding to the first identification information entry in a second memory and stores the first sequence information entry indicating a current value of a sequence number in association with the first identification information entry in the second memory after receiving the first identification information entry and a first execution information entry indicating that the authentication process has been executed from the management apparatus, the second memory being configured to store the identification information entries of the individual authentication targets, each in association with an execution information entry indicating whether the authentication of an authentication target corresponding to the identification information entry has been executed, the sequence number being a number of times of updating one of execution information entries stored in the second memory, the first communication interface acquires, from the management apparatus, a second execution information entry and a second sequence information entry stored in the second memory in association with a second identification information entry, and stores, in the first memory, the second execution information entry and the second sequence information entry in association with the second identification information entry which is identified based on a result obtained by comparing the first sequence information entry stored in the first memory against a different sequence information entry received prior to the reception of the first sequence information entry.

* * * * *